United States Patent [19]
Fujikawa et al.

[11] Patent Number: 5,096,518
[45] Date of Patent: Mar. 17, 1992

[54] METHOD FOR ENCAPSULATING MATERIAL TO BE PROCESSED BY HOT OR WARM ISOSTATIC PRESSING

[75] Inventors: Takao Fujikawa; Kazuhiko Nakajima; Yasuo Manabe, all of Kobe, Japan

[73] Assignee: Kabushiki Kaisha Kobe Seiko Sho, Kobe, Japan

[21] Appl. No.: 480,764

[22] Filed: Feb. 16, 1990

[30] Foreign Application Priority Data

| Feb. 22, 1989 | [JP] | Japan | 1-43927 |
| Mar. 6, 1989 | [JP] | Japan | 1-54457 |
| Apr. 14, 1989 | [JP] | Japan | 1-95493 |
| Jun. 8, 1989 | [JP] | Japan | 1-147676 |

[51] Int. Cl.$^5$ ............................... B32B 18/00
[52] U.S. Cl. ............................. 156/89; 264/56; 264/62; 264/65; 264/125; 419/39; 419/42; 419/49; 419/68
[58] Field of Search ............ 156/89; 264/62, 65, 264/56, 66, 125, 332, DIG. 58; 419/16, 39, 42, 49, 68

[56] References Cited

U.S. PATENT DOCUMENTS

| 2,781,273 | 2/1957 | Koch | 264/125 |
| 3,016,598 | 1/1962 | Anderson et al. | 264/65 |
| 3,340,053 | 9/1967 | Hodge et al. | 419/49 |
| 4,077,109 | 3/1978 | Larson | 419/49 |
| 4,435,360 | 3/1984 | Trottier et al. | 419/49 |
| 4,547,337 | 10/1985 | Rozmus | 264/65 |
| 4,602,952 | 7/1986 | Greene et al. | 419/49 |
| 4,647,426 | 3/1987 | Florentino | 264/65 |
| 4,670,214 | 6/1987 | Magnuson et al. | 264/65 |

Primary Examiner—Caleb Weston
Attorney, Agent, or Firm—Oblon, Spivak, McClelland, Maier & Neustadt

[57] ABSTRACT

Described herein is a method of encapsulating a material to be processed by warm or hot isostatic pressing, and an apparatus suitable for practicing the method, which basically includes the steps of (a) enveloping a processing material in the form of loose or compacted powder with a metal foil of 30 μm in thickness, and (b) welding overlying and underlying metal foil portions to encapsulate said material in said metal foil in sealed state.

11 Claims, 19 Drawing Sheets

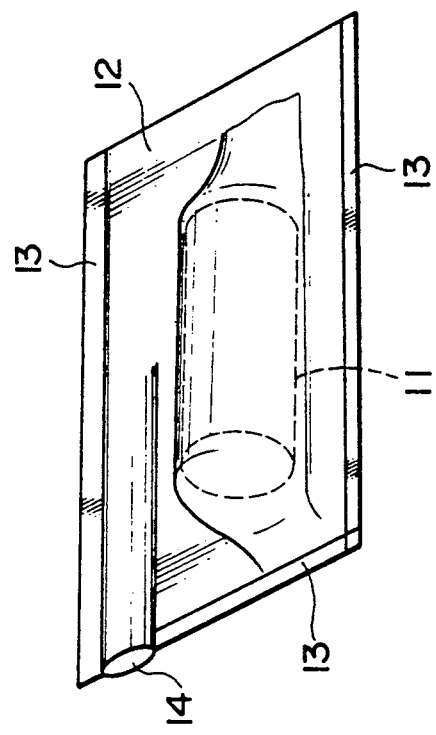
FIG. 1(I)
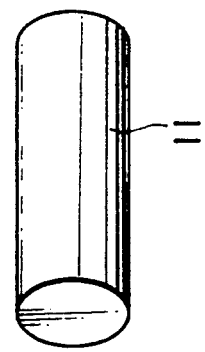

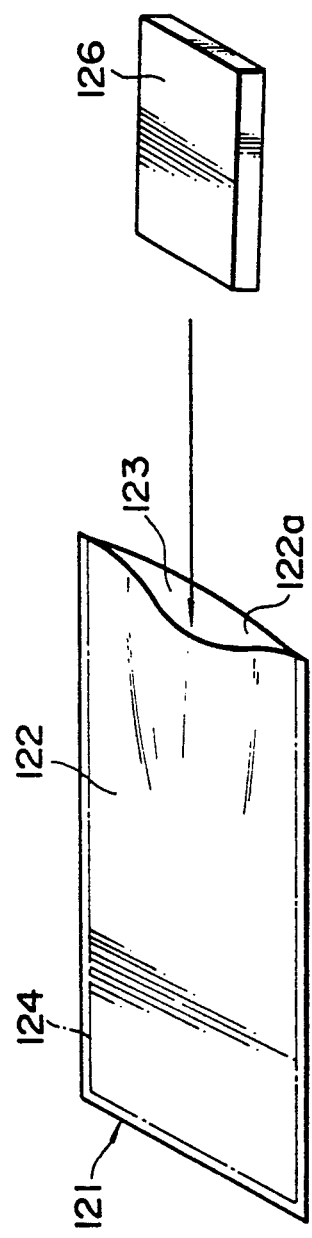
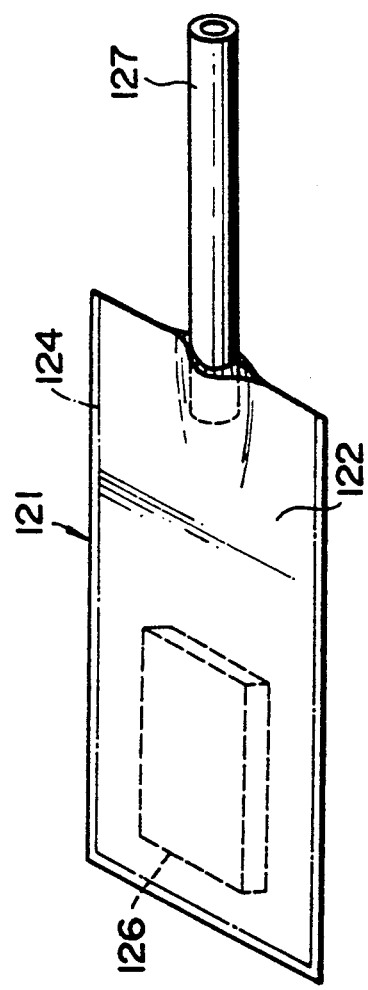

METHOD FOR ENCAPSULATING MATERIAL TO BE PROCESSED BY HOT OR WARM ISOSTATIC PRESSING

BACKGROUND OF THE INVENTION

1. Field of the Invention

This invention relates to a method and an apparatus for encapsulating material to be processed by warm isostatic pressing (WIP) or hot isostatic pressing (HIP) processes which are resorted to when producing sinters of high density by applying a high fluid pressure under high temperature condition to a green compact of ceramics powder of alumina, partially stabilized zirconia, barium titanate, zinc oxide, molybdenum disulfide or the like or a green compact of intermetallic compound powder of Ti-Al, Ni-Al or the like, or when diffusion-bonding two or more kinds of materials by application of a high fluid pressure under high temperature condition, for example, when joining overlapped sheets or plates of two or more different kinds of metals or a metallic or ceramics sheet or plate with a melt-coated ceramics or metal layer.

2. Discussion of the Background

The HIP or WIP process is a compressive forming process in which a high pressure fluid of several hundreds to several thousands $kgf/cm^2$ is applied under high temperature condition. These processes are distinguished by high working pressure and the capability of isostatic compression as compared with other processes, for producing sinters of high density from hardly workable powdery material or for solid phase diffusion bonding. Although it is possible to generate a temperature over 2,000° C. in the case of the HIP process, which employs a high pressure gas as a pressure medium, the WIP process, which uses a heat resistant oil, has an upper temperature limit at about 300° C. However, in the case of high density sintering or solid phase diffusion bonding of powder material, both of these processes need a pretreatment for covering the entire work surface with a material that is capable of forming a hermetic seal.

In this connection, it is the general practice to seal the powder material in a metal capsule, as disclosed in Japanese Laid-Open Patent Applications 47-16308 and 57-116702, which are directed to a method of pretreatment.

Exemplified in FIG. 16 is a method as proposed in Laid-Open Patent Application 47-16308, in which alternately overlapped layers of plate-like processing material 201 and metal foil 202 are placed in a metal tube 204 with a wall thickness of 3-6 mm and a welded bottom 203, and a closure lid 206 with an evacuation pipe 205 is welded to close the upper opening of the metal tube 204. Thereafter, the tube 204 is evacuated by vacuum pumping through the pipe 205 and sealed to form a capsule.

FIG. 17 exemplifies a method proposed by Laid-Open Patent Application 57-116702, in which firstly processing material 211 is placed in a tube 212 with a wall thickness of 3-6 mm in such a manner that the processing material 211 is kept out of contact with the tube 212. Then, the space between the processing material 211 and tube 212 is filled with a secondary pressure medium 213. After burying the processing material 211 completely in the secondary pressure medium 213, a closure lid 214 is circumferentially welded to a welding portion 215, and the tube 212 is evacuated by vacuum pumping through an exhaust pipe 216, closing a middle portion of the exhaust pipe 216 by fusion welding. In this case, the capsule has a greater degree of freedom in shape with respect to shape of the processing material 211 as compared with the example shown in FIG. 16 and can cope with a processing material of complicate shape.

The prior art capsules shown in FIGS. 16 and 17 have a number of problems as discussed below with reference to FIGS. 18(1) and 18(2) which show a processing material before and after a HIP treatment.

(1) The prior art capsules are formed of a metal tube or plate with a wall thickness of 3-16 mm, so that the rigidity in peripheral edge portions of the capsules (indicated by references 221 to 224 in FIG. 18(1)) differs from that of center portions (indicated by references 225 to 227 in FIG. 18(1)). Therefore, the capsules are deformed non-uniformly in the pressure elevating stage of the process, and the capsule portions with smaller rigidity are deformed prior to other portions of the capsules without undergoing deformation uniformly according to the applied pressure, hindering uniform transmission of pressure to the processing material and as a result causing distortion to the processing material. For example, as shown in FIG. 18(2), contraction into a spool-like shape occurs to the processing material. Therefore, due to the difficulty of securing flatness, these capsules are practically hardly applicable in a case where the processing material is in the form of a thin sheet of about 1 mm in thickness.

(2) When encapsulating the processing material, a difficulty is often encountered in inserting the material into a capsule, as shown in FIG. 16, in which the gap space between the processing material and the capsule is too narrow. Considering that a too broad gap space is a hindrance to the pressure transmission, it is necessary to determine the dimensions of the capsule for each processing material in such a manner as to leave a gap space of an appropriate width between the inner and outer diameters of the capsule and processing material. On the other hand, in case of the method of FIG. 17, the process is also complicated by the necessity for filling the gap space between the capsule and processing material with a secondary pressure medium which will not hinder the pressure transmission.

(3) Owing to the non-uniform deformation and distortion of the capsule under pressure and the large wall thickness of the capsule, difficulties are often encountered in taking out the processed material after the isostatic pressing treatment, necessitating to remove the capsule by means of a lathe or by the use of a strong acid. This also makes the process complicated.

(4) The seal which is formed by fuse-welding part of a rigid evacuation pipe often results in an inferior sealing condition and lacks reliability. The capsule of FIG. 16 requires the provision of means for preventing the secondary pressure medium from being suctioned at the time of gas evacuation, and therefore is disadvantageous from the standpoint of productivity.

SUMMARY OF THE INVENTION

In view of the above-described problems or drawbacks of the prior art, the present invention has as its object the provision of a method for encapsulating a material to be treated by a warm or hot isostatic pressing process, which can preclude the distortion of processing material due to non-uniform capsule deformation in the isostatic pressing stage and which can cope with a processing material of complicated shape while simplifying the steps of encapsulating the material in the capsule as well as the extraction or ejection of the processed material from the capsule.

It is another object of the present invention to provide an apparatus suitable for carrying out the above-mentioned encapsulating method in an efficient manner.

In accordance with the present invention, there is provided a method for encapsulating a material to be treated by a warm or hot isostatic pressing process in which a processing material in the form of powder of loose or compacted powder is placed and sealed in a metal capsule, characterized in that the method essentially comprises, as technical means for achieving the above-stated objects, a step of forming the metal capsule from a metal foil having a thickness of 30 μm to 300 μm.

Since in the present invention, the capsule is formed of a thin metal foil of 30-300 μm in thickness as stated above, it undergoes uniform contraction in a degree in comformity with contraction of the processing material, precluding distortion which might otherwise be caused to the processing material as a result of non-uniform contraction of the capsule. The capsule can be readily removed after an isostatic pressing process because the metal foil can be easily cut off with tinman's shears or easily peeled off the processed material. For forming a capsule, firstly a processing material is sandwiched between metal foils and, after intimately contacting metal foil portions around the processing material, these metal foil portions are welded to each other. The metal foil can easily change its shape into conformity with the shape of the processing material, so that the capsule has a great degree of freedom in shape and need not necessarily be prepared in a shape corresponding to a particular processing material to be encapsulated. Further, as the metal foils are held in intimate contact with the processing material, there is no need for filling a secondary pressure medium around the processing material.

The thickness of the metal foil to be used in the present invention is determined depending upon its flexibility, plastic deformability and shear strength and, more specifically, is preferred to be in the range of 30-300 μm.

This is because more often than not metal foils contain pin holes when the thickness is smaller than 30 μm and might not be able to secure the hermetical sealing effect of the material itself. Besides, thin metal foils are not practical since slight bruise or damage in transportation might result in a puncture.

On the other hand, when the thickness is in excess of 300 μm, it becomes difficult to cut the metal foil with tinman's shears or other simple tools and to remove the capsule after a HIP treatment without using a lathe or other machine which is detrimental to the merits of the invention.

More specifically, the metal foil is preferred to be smaller than 100 μm in thickness from the standpoint of facilitating the removal of the capsule after the HIP treatment.

In accordance with the present invention, there is also provided an apparatus for practicing the above-described method of the invention in an efficient manner, which apparatus includes in combination: a clamp means for holding in intimate contact overlying and underlying portions of metal foil enveloping a processing material; a means for welding the metal foil portions with a beam projected in a direction substantially perpendicular to the surface of the metal foil; and a feed means connected either to the welding means or to the metal foil to move the welding means or metal foil in a plane substantially parallel with the surface of the metal foil.

BRIEF DESCRIPTION OF THE DRAWINGS

In the accompanying drawings:

FIGS. 1(1) to 1(4) are schematic illustrations of the steps of encapsulation in a first embodiment of the invention, of which:

FIG. 1(1) is a perspective view of a capsule according to the invention and a processing material to be encapsulated;

FIG. 1(2) is a perspective view of the capsule and processing material connected to a vacuum pump for gas evacuation;

FIG. 1(3) is a perspective view of the capsule in sealed state; and

FIG. 1(4) is a sectional view of a hot isostatic press machine;

FIGS. 2(1) to 2(3) are schematic illustrations of the steps of encapsulation in a second embodiment of the invention, of which:

FIG. 2(1) is a perspective view of a processing material sandwiched between metal foils in clamped state;

FIG. 2(2) is a sectional view of the processing material sandwiched between metal foils in clamped state; and FIG. 2(3) is a perspective view of the capsule in sealed state;

FIGS. 3(1) to 3(4) are schematic illustrations of the steps of encapsulation in a third embodiment of the invention, of which:

FIG. 3(1) is a perspective view of a processing material;

FIG. 3(2) is a perspective view of metal foils

FIG. 3(3) is a sectional view of the processing material sandwiched between the metal foils in clamped state; and FIG. 3(4) is a partly cutaway front view of an apparatus for practicing the invention by means of light beam welding;

FIGS. 4(1) to 4(4) are schematic illustrations of the steps of encapsulation in a fourth embodiment of the invention, of which:

FIG. 4(1) is a perspective view of a capsule in clamped state;

FIG. 4(2) is a sectional view of the capsule being welded in an inert gas atmosphere;

FIG. 4(3) is a sectional view on an enlarged scale of the portions encircled in FIG. 4(2); and FIG. 4(4) is a partly cutaway front view of an apparatus for practicing the invention by means of light beam welding;

FIGS. 6(1) to 6(3) are schematic illustrations of the steps of encapsulation in a fifth embodiment of the invention, of which:

FIG. 6(1) is a perspective view of a capsule in clamped state;

FIG. 6(2) is a sectional view of the capsule being welding in an inert gas atmosphere; and FIG. 6(3) is a sectional view on an enlarged scale of the portions encircled in FIG. 6(2);

FIGS. 7(1) and 7(2) are schematic illustrations of a magnet type clamp employed in the present invention, of which:

FIG. 7(1) is a sectional front view; and

FIG. 7(2) is a plan view of the clamp;

FIGS. 8(1) to 8(4) are schematic illustrations of the steps of encapsulation in a sixth embodiment of the invention, of which:

FIG. 8(1) is a perspective view of a processing material and a capsule used in the present invention;

FIG. 8(2) is a perspective view of the capsule in a gas evacuating stage;

FIG. 8(3) is a perspective view of the processing material being sealed in the capsule by welding; and FIG. 8(4) is a perspective view of the capsule in sealed state;

DETAILED DESCRIPTION OF PREFERRED EMBODIMENTS

Figure 1:
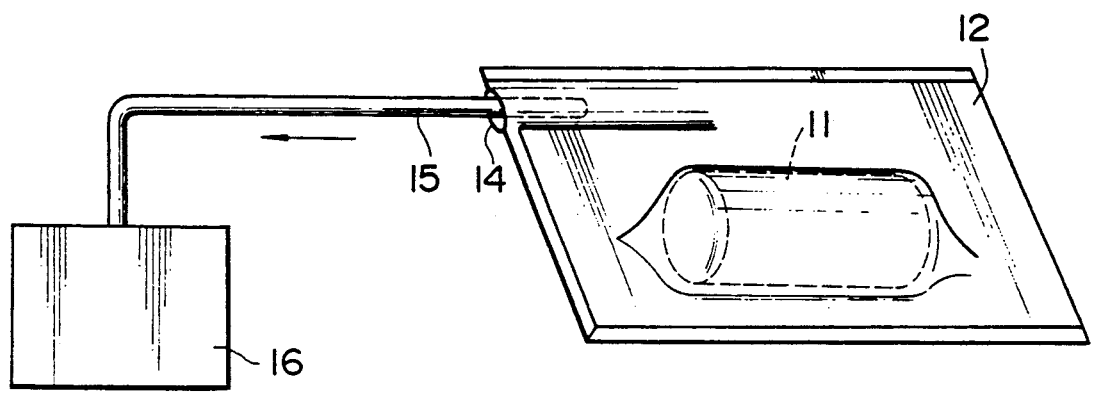
Figure 1:
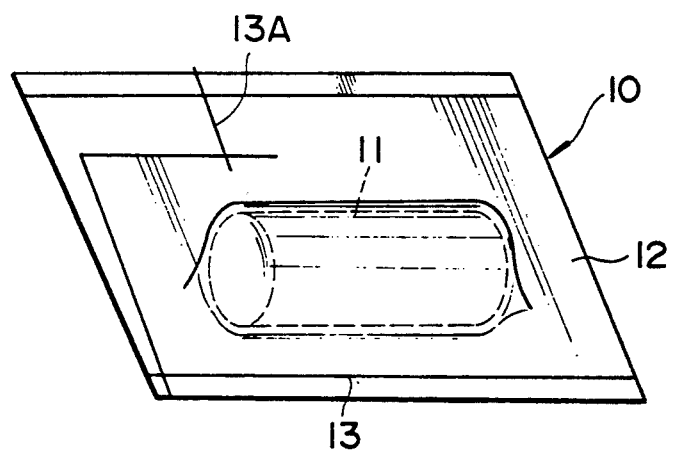
Figure 1:
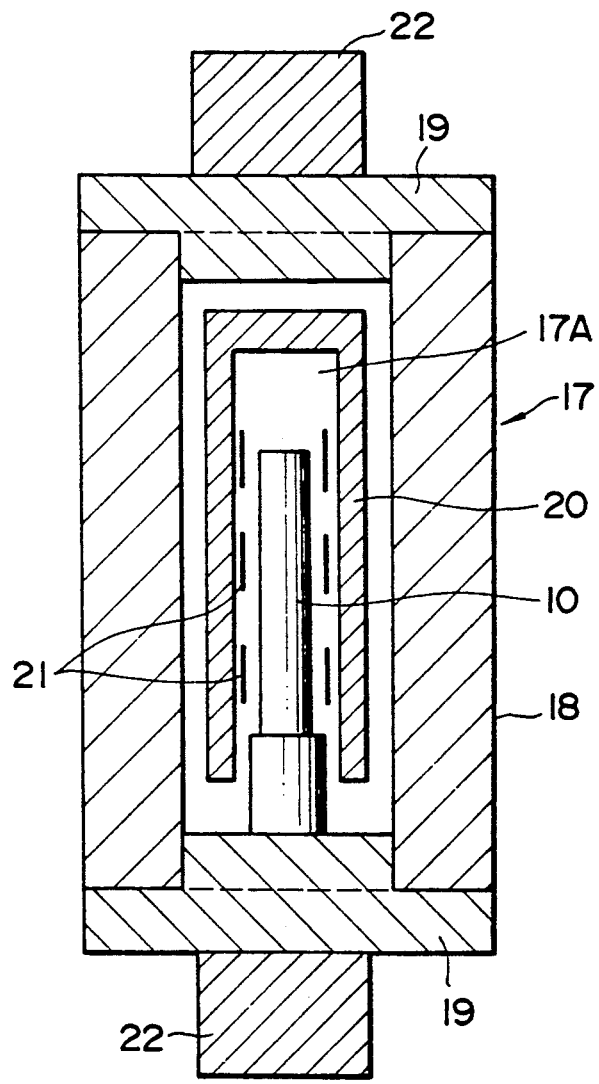

Referring to FIGS. 1(1) to 1(4), there are shown the steps of forming a capsule 10 in the first embodiment of the invention, i.e., a capsule consisting of a folded metal foil and sandwiching a processing material 11 between the overlying and underlying metal foil portions to form the material into a cylindrical shape.

As shown in FIG. 1(1), a green body or compact of powdery processing material 11 is wrapped in a folded metal foil 12 with a thickness of 30-300 μm. The open sides of the folded metal foil 12 are closed by seam welding as indicated at 13 while leaving an opening 14 as an evacuation port. A pipe 15 from a vacuum pump 16 is inserted into the evacuation port 14 as shown in FIG. 1(2) to evacuate gases, and then the evacuation port 14 is closed likewise by seam welding 13A as shown in FIG. 1(3) to form an evacuated and sealed metal capsule 10 containing the processing material 11.

The metal capsule 10 is set in a HIP apparatus 17 to undergo a HIP treatment in a processing chamber 17A as shown in FIG. 1(4). Namely, the green body or compact 11 in the capsule 10 undergoes compressive forming under the synergistic effect of pressure gas medium and heat.

In FIG. 1(4), indicated at 18 is a high pressure vessel, at 19 are closures, at 20 is a heat insulation mantle, at 22 is a heater, and at 22 is a press frame.

Figure 2:
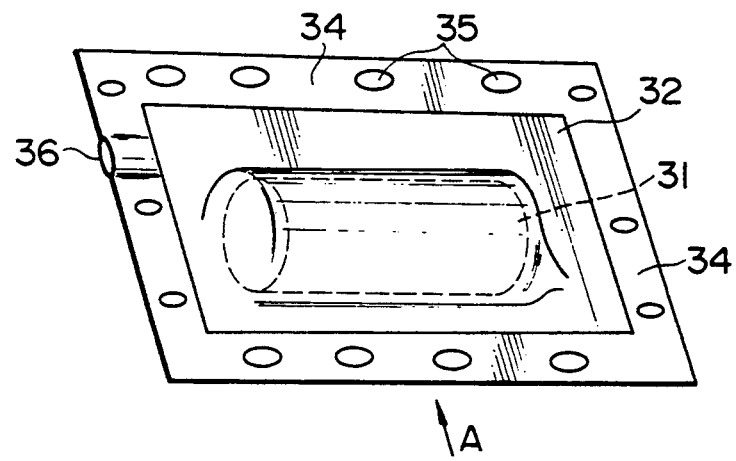
Figure 2:
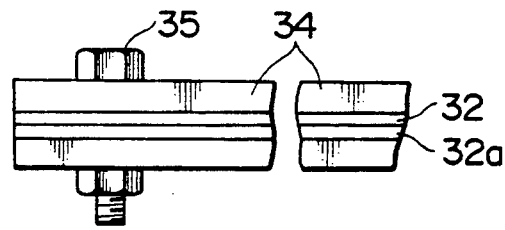
Figure 2:
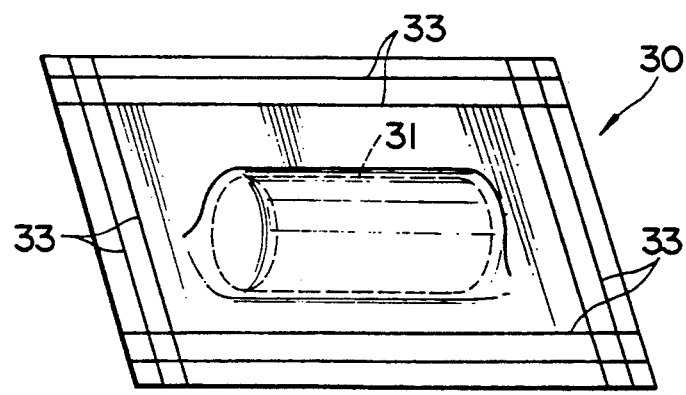

Illustrated in FIGS. 2(1) to 2(3) are the steps of encapsulation in the second embodiment of the invention, in which a cylindrical processing material 31 is sandwiched between two separate metal foils 32 and 32a to be formed into a capsule. FIG. 2(2) is a sectional view taken in the direction of arrow A in FIG. 2(1), and FIG. 2(3) is a view of a sealed capsule as finally obtained.

The processing material 31 is wrapped in 30-300 μm thick metal foils 32 and 32a, and, after fixing peripheral portions of the metal foils between holder frames 34 by means of bolts 35 and evacuating gases through an evacuation hole 96, the metal foils are welded together by electron beam welding to form seals 33.

The resulting capsule 30 is processed by hot isostatic pressing in the same manner as described hereinbefore.

Figure 3:
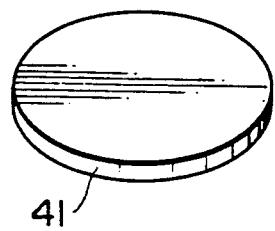
Figure 3:
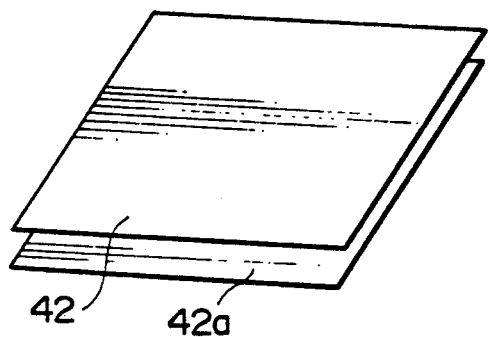
Figure 3:
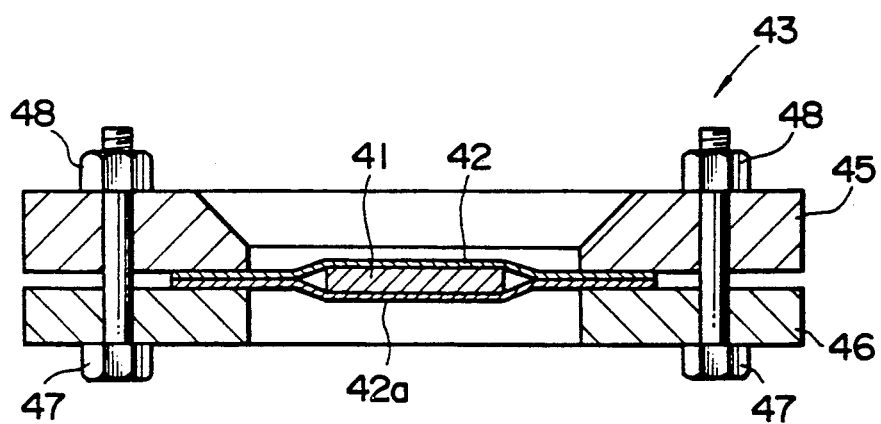
Figure 3:
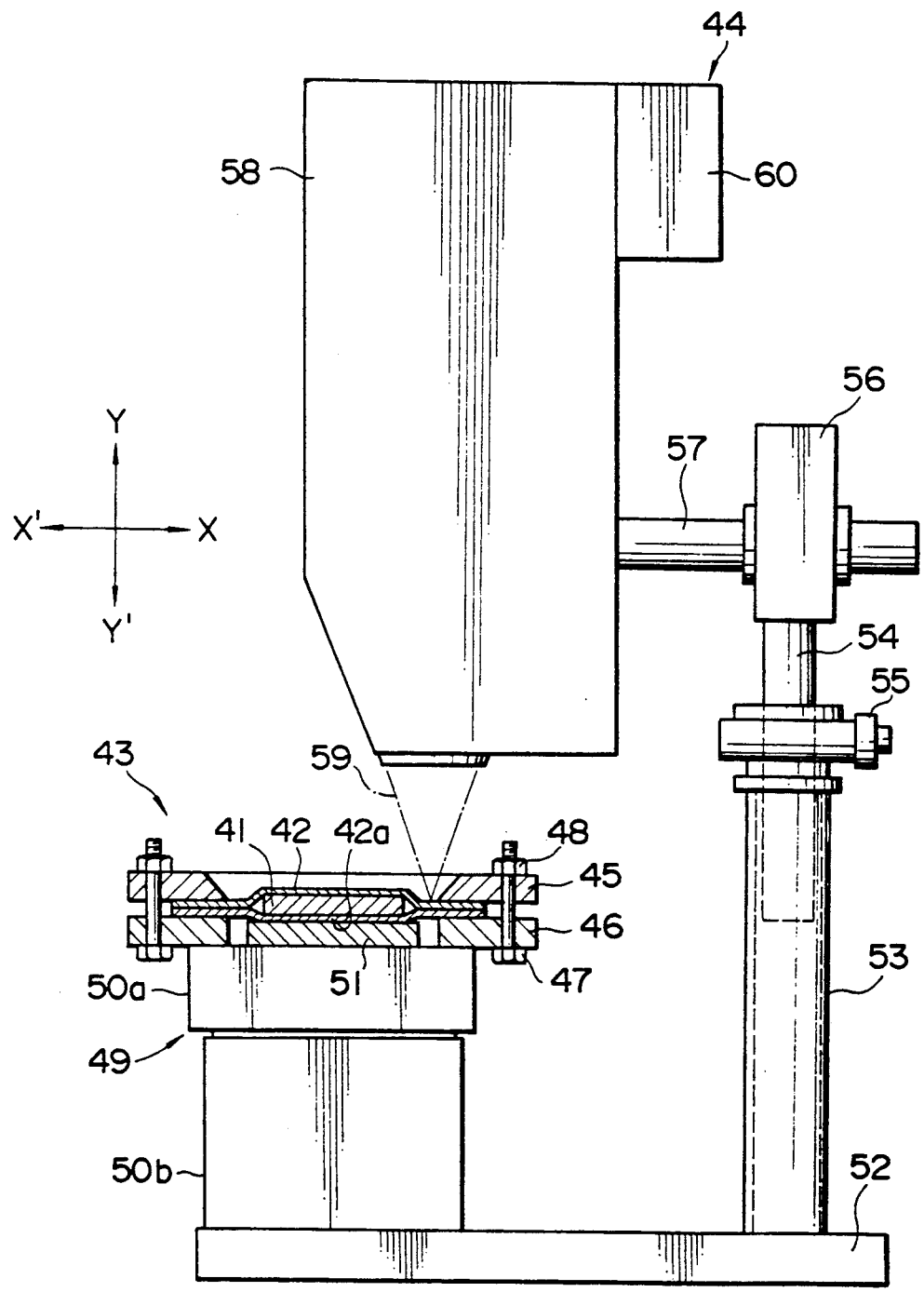

Referring now to FIGS. 3(1) to 3(3), there are shown the steps of encapsulation in the third embodiment of the invention, wherein a processing material 41 of disk-like shape is sandwiched between two separate metal foils 42 and 42a to be formed into a capsule.

More specifically, FIG. 3(1) shows the disk-like material 41 to be processed by hot or warm isostatic pressing, and FIG. 3(2) shows a couple of metal foils 42 and 42a to be tailored into a capsule. Then, as shown particularly in FIG. 3(3), the overlying and underlying metal foil portions around the sandwiched processing material 41 are held in intimate contact with each other by means of a clamp 43. In the next place, the intimately contacting portions are welded together by a light beam welding machine 44 as shown in FIG. 3(4).

As seen in FIG. 3(3), the processing material 41 which is sandwiched between the metal foils 42 and 42a is placed between upper and lower clamp rings 45 and 46 of the clamp 43. A number of bolts 47 which are passed through the upper and lower rings and nuts 48 are tightened to hold the overlying and underlying metal foil portions 42 and 42a around the processing material 41 in intimate contact with each other.

In FIG. 3(4), the reference 49 denotes a feed mechanism (a turn table in this particular embodiment) which is movable in a plane parallel with the metal foil surface. The feed mechanism 49 includes a cylindrical turn table 50a mounted on a base column 50b similarly of a cylindrical shape, and a motor (not shown) housed in the base column 50b to turn the table 50a supporting thereon the clamp 43 which holds the processing material 41 between the metal foils 42 and 42a. Designated at 51 is a support member which serves to support the processing material 41 and metal foils 42 and 42a stably on the turn table 50a. The feed mechanism 49 is mounted on a base 52. In addition to the feed mechanism 49, the base 52 supports thereon a support column 53 at one side of the feed mechanism 49. The support column 53 is constituted by a metal pipe having a Y-axis direction feed shaft 54 fitted therein through its upper opening. The Y-axis direction feed shaft 54 is movable relative to the support column 53 in the direction Y—Y' of FIG. 3(4). An adjusting screw 55 which is mounted on an upper portion of the support column 53 is connected with the Y-axis feed shaft 54 through a rack and pinion mechanism. A support member 56 which is securely fixed in an upper portion of the Y-axis feed shaft 54 supports an X-axis direction feed shaft 57 for movement in the direction X—X' in FIG. 3(4).

A lamp house 58 of the light beam welding machine 44 is fixedly mounted on an end of the X-axis direction feed shaft 57 on the side of the feed mechanism 49 and in a position over the metal foil 42. The axis of the light beam 59 is disposed substantially in a direction vertical to the surface of the metal foil 42. The light beam welding machine 44 is constituted by the lamp house 58 and a lamp starter 60 which is mounted on the side wall of the lamp house 58 on the side of the support column 53.

In this instance, the feed mechanism may be arranged to move the capsule or the welding machine whichever is suitable in consideration of the sizes, weights of the capsule and welding machine or other conditions. Namely, it is desirable to move the capsule in a case where it is of a small size, and to move the welding machine in a case where the capsule is large in size. By the term "a plane substantially parallel", it is meant that the plane of movement of the feed mechanism is desired to be parallel with the metal foil surface although slight deviations would not give rise to any problem. The term "a direction substantially vertical" means that it is desirable to be vertical to the metal foil surface although slight deviations would not cause any problem.

According to an aspect of the invention, when bringing the overlying and underlying metal foil portions around the processing material into intimate contact with each other, it is important that the gap width between contacting portions be smaller than 1/10 of the metal foil thickness. This is necessary in order to weld the metal foils by light, laser or electron beam welding free of breaks in the weld line. If greater than 1/10, the weld tends to contain breaks or unwelded portions here and there, failing to form a seal. The welding methods useful in the present invention include light beam welding, laser welding and electron beam welding. These methods are suitable for welding overlapped metal foils with a thickness of 30–300 $\mu$m as compared with other methods which are difficult to apply due to problems such as dribbling or insufficient fusion..

Now, the encapsulation of a processing material prior to warm or hot isostatic pressing, according the method of the invention, is explained step by step with reference to FIGS. 3(1) to 3(4).

Firstly, a processing material 41 and two metal foil strips 42 and 42a are prepared (FIGS. 3(1) and 3(2)), and then the processing material 41 is sandwiched between the metal foils 42 and 42a.

In the next place, the overlapped metal foil portions 42 and 42a around the processing material 41 are inserted and held between the upper and lower rings 45 and 46 of the clamp 43, followed by tightening of the bolts 47 and nuts 48 to bring the metal foils 42 and 42a into intimate contact with each other (FIG. 3(3)).

In this state, the processing material 41, metal foils 42 and 42a, and clamp 43 are fixed on the turn table 50a by fixation means (not shown), holding the processing material 41 and metal foils 42 and 42a in a stabilized state by the use of support members 51 in the form of spacers or the like.

Nextly, the position of the lamp house 58 of the light beam welding machine 44 in X—X' direction is adjusted by moving the X-axis feed shaft 57, and the focus of the light beam 59 is adjusted by moving the lamp house 58 upward or downward through the adjusting screw 55. Thereafter, while rotating the turn table 50a, the shooting of the light beam 59 is initiated by operating the lamp starter 60 to weld together the intimately contacting metal foil portions 42 and 42a, thereby encapsulating the processing material 41 in the metal foil in sealed state (FIG. 3(4)).

The thus encapsulated processing material is subjected to a HIP treatment in the same manner as described hereinbefore.

Figure 4:
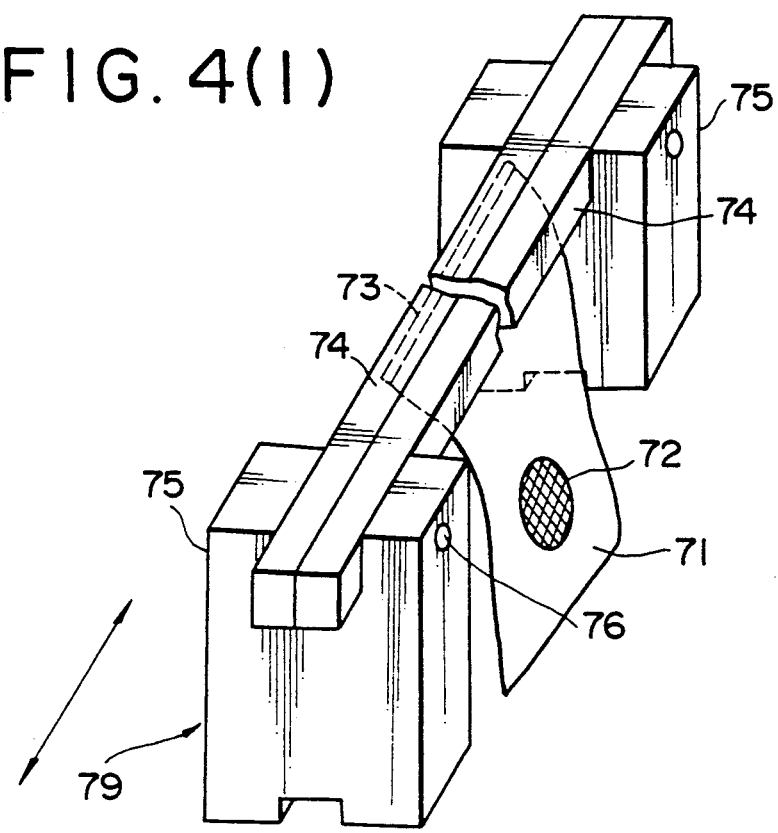
Figure 4:
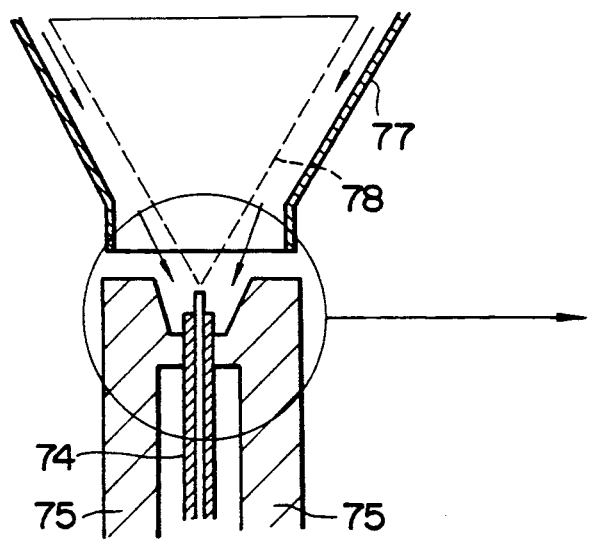
Figure 4:
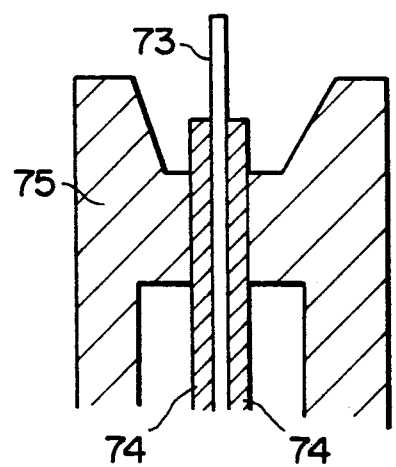
Figure 4:
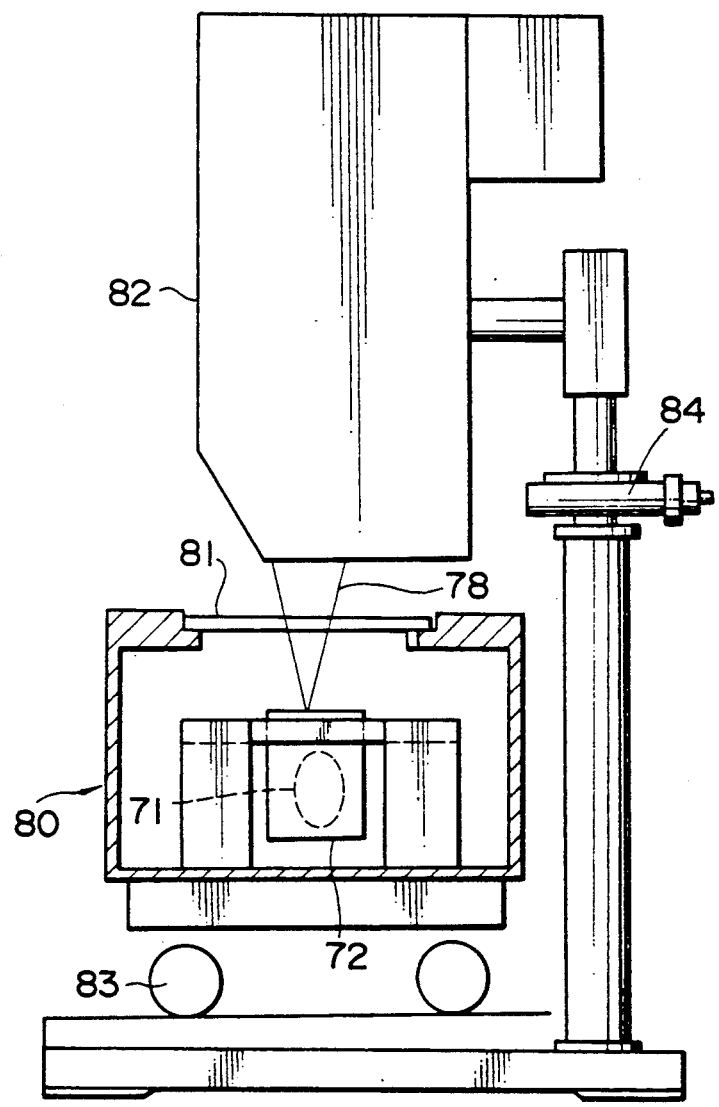

Referring to FIGS. 4(1) to 4(4), there are shown the steps of encapsulation in the fourth embodiment of the invention. In this embodiment, a processing material 72 is wrapped in a lead foil 71 of 30–300 $\mu$m in thickness, and the open side 73 of the lead foil bag is gripped in a copper clamping jig 75 between copper clamp plates 74 which are fixed in position by bolts 76. The open side 73 which sticks out from the clamp plate, namely, the seal portion 73 is then sealed as it is irradiating with a light beam 78 in an inert gas atmosphere which is created, for example, by supplying argon gas or other inert gas through a nozzle 77.

The thus encapsulated processing material is subjected to a HIP treatment in the same manner as described hereinbefore.

The lead foil enveloping the processing material 72 and gripped in the clamp device 79 as shown in FIG. 4(1) is sealed in a vacuum chamber 80, which is maintained in vacuum state, by the light beam 78 projected on and along the seal portion 73.

As shown in FIG. 4(4), the light beam 78 from a light beam welding machine 82 is projected into the vacuum chamber 80 through a window in which a sheet of a transparent light transmissive material 81 like quartz glass is hermetically fitted through an O-ring. The vacuum chamber 80 is supported on a carriage or suitable travel mechanism 83, while the welding machine 82 can be moved up and down by an adjusting screw mechanism 84 for adjusting its position in the vertical direction.

The light beam welding in the vacuum chamber is described in greater detail below with reference to FIG. 5.

Figure 5:
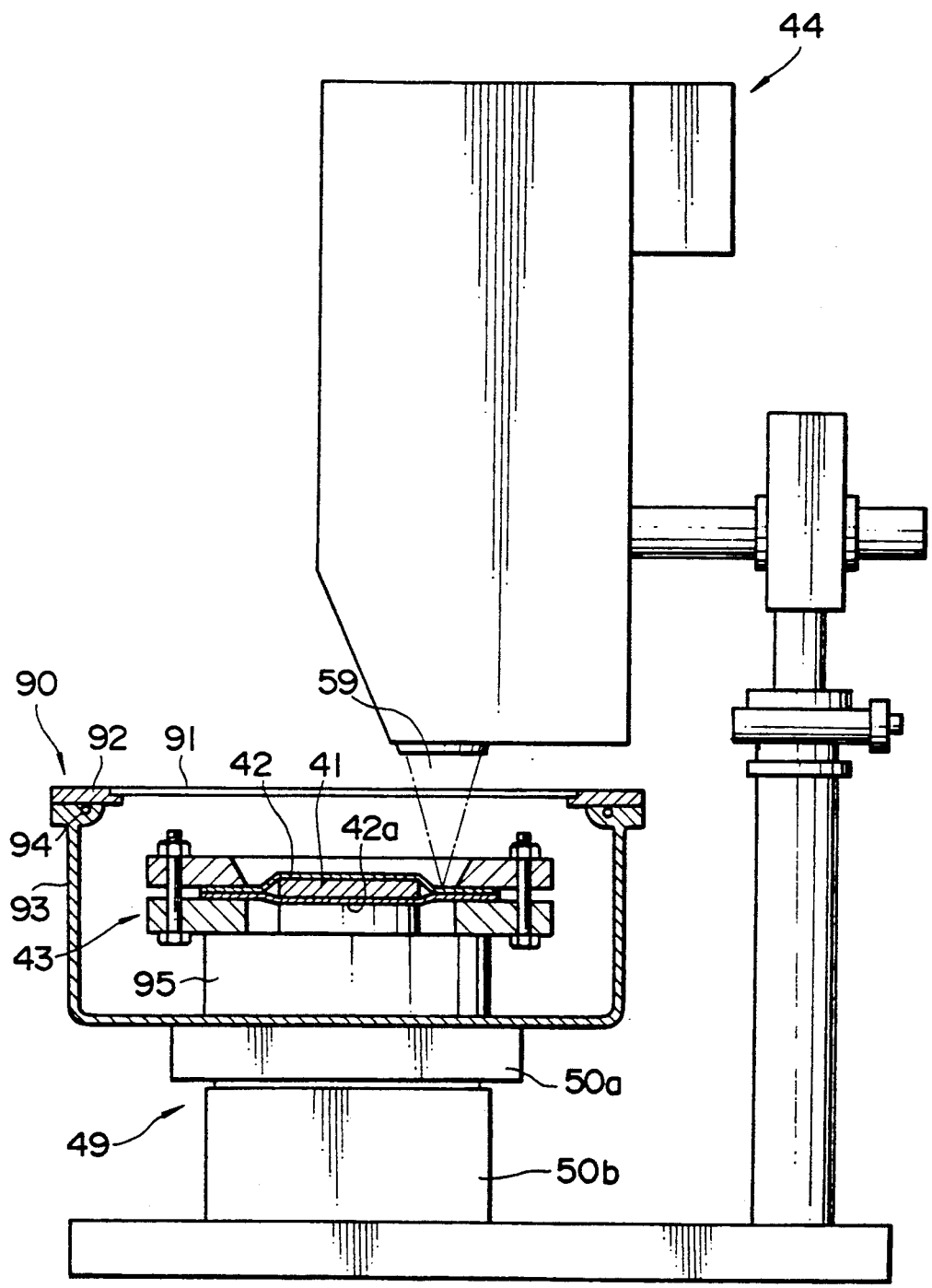
FIG. 5 is a partly cutaway front view of an apparatus for practicing the present invention, which is arranged to form a capsule by light beam welding in a vacuum chamber.

FIG. 5 illustrates an example of the encapsulating apparatus of FIG. 3(4), which includes a vacuum chamber 90 provided on the turn table 50a and accommodating the clamp 43 and a processing material 41 and metal foils 42 and 42a gripped in the clamp 43 to form a capsule by light beam welding in vacuum state.

In FIG. 5, the vacuum chamber 90 is provided with a ring-like closure lid 92 with a window 91 having a disk-like light transmissive glass hermetically fitted in a ring, and a cylindrical container portion closed at the bottom end and openably closed at the upper end by the closure lid 92.

Embedded at the upper end of the container 93 is an O-ring 94 which hermetically seals the gap between the closure 92 and the container 93. Indicated at 95 is a fixation means which holds the clamp 43 securely in position within the vacuum chamber 90.

In this particular embodiment, the clamp 43 is placed in the vacuum chamber 90 together with the processing material 41 and metal foils 42 and 42a which are gripped by the clamp 43, followed by vacuum pumping for evacuating gases from the vacuum chamber 90 (though the evacuation means is omitted in the drawings). In this state, the light beam 59 is projected into the vacuum chamber 90 through the light transmitting glass window 91, while the turn table 50a is put in rotation so that the processing material 41 is sealed in a capsule by circular lap-welding under vacuum condition.

Although a glass window is used as a window in this embodiment, it is desirable to use quartz for the window since it is excellent in light transmittancy and easily available.

In a case where a capsule is formed under vacuum condition as in the embodiment of FIG. 5, there can be obtained a product of high quality with no residual air in extra spaces within the capsule or in pores of the processing material, preventing oxidation of the processing material which would lead to degradations in quality of the final product.

Figure 6:
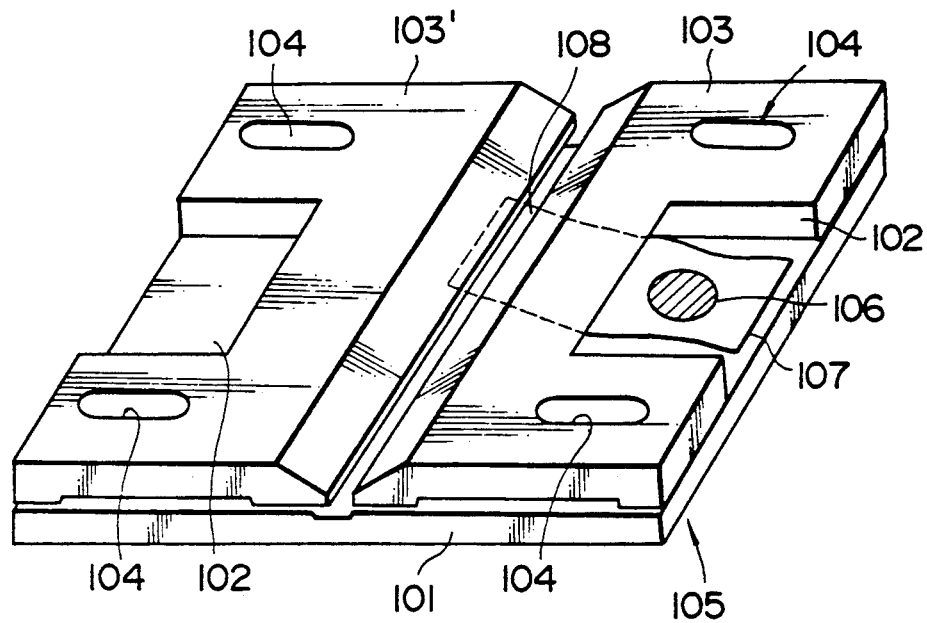
Figure 6:
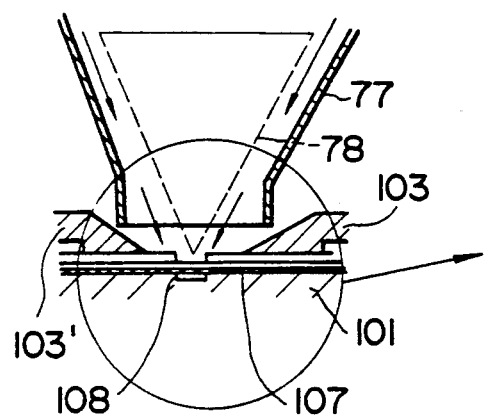
Figure 6:
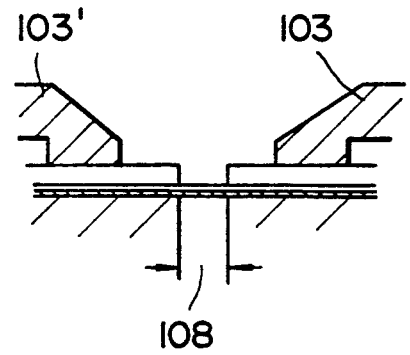

Referring to FIGS. 6(1) to 6(3), there is shown the fifth embodiment of the invention, in which a processing material 103 wrapped in stainless or lead foil 107 of 30 μm–300 μm in thickness is gripped in a clamp jig 105 which is constituted by a copper clamp surface plate 101 and a pair of copper clamp plates 103 and 103' which are provided with a notched portion 102 and fastened to the surface plate 101 by bolts (not shown) inserted in bolt holes 104. The overlapping foil portions are sealed as they are fuse-cut by the light or laser beam which is irradiated along the slit between the paired clamp plates 103, thereby forming a capsule.

In this fifth embodiment, the metal foils are sealed by the fuse-cutting which is carried out also in an inert gas atmosphere by supplying argon gas through a nozzle 77 as shown in FIG. 6(2). Those portions which are encircled in FIG. 6(2) are illustrated on an enlarged scale in FIG. 6(3).

Instead of the bolt and nut type clamping device in the foregoing embodiments, it is desirable to use a magnet type clamping device which is easier to handle.

Figure 7:
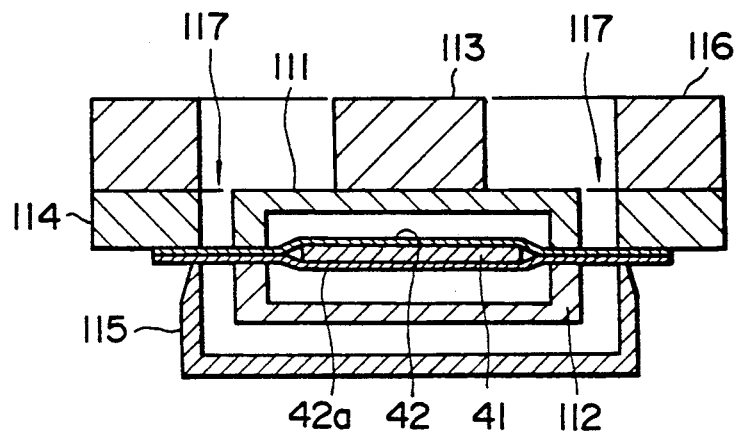
Figure 7:
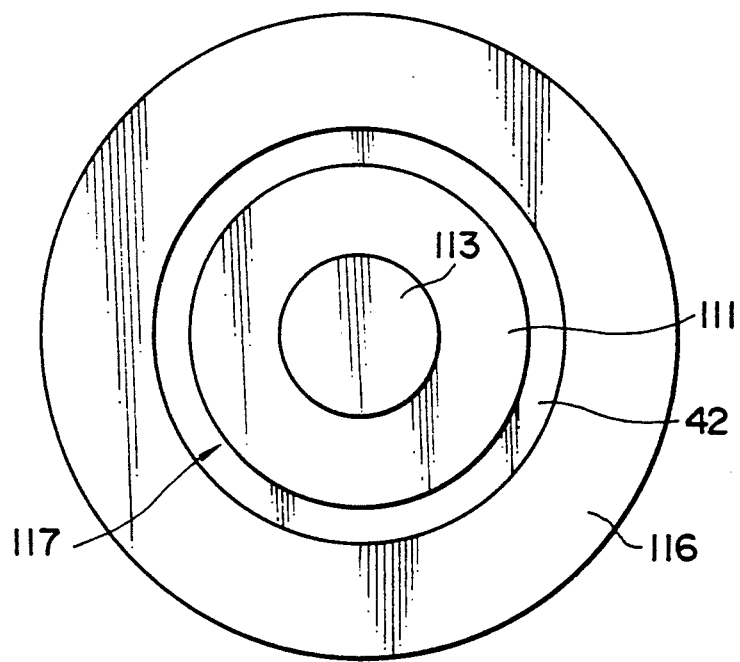

An example of the magnet type clamping device is shown in FIGS. 7(1) and 7(2) in sectional and plan views, respectively, in which indicated at 41 is a processing material and at 42 and 42a are metal foils. The references 111 and 112 denote a pair of upper and lower disk-like clamp members of an inner clamp, which are disposed face to face to grip metal foils 42 and 42a therebetween. Mounted on top of the upper clamp member 111 is a magnet 113 which holds the upper and lower clamp members 111 and 112 in intimate contact with each other across the metal foils 42 and 42a. On the other hand, the references 114 and 115 indicate a pair of upper and lower clamp members of an outer clamp, which are of ring- and disk-like shapes, respectively. The ring-like upper clamp member 114 is so located as to contact the marginal edge of the recessed side of the disk-like lower clamp member 115 through the metal foils 42 and 42a. Mounted on top of the upper clamp member 114 is a ring magnet 116 which attracts the lower clamp member 115 into intimate contact with the upper clamp member 114 through the metal foils 42 and 42a which are gripped therebetween. Thus, the overlying and underlying metal foils 42 and 42a are maintained in intimate contact with each other by the inner and outer clamps.

The upper and lower clamp members 111 and 112 of the inner clamp are located concentrically with each other, leaving a ring-like clearance 117 between the upper clamp members 111 and 114 of the inner and outer clamps to pass therethrough the light beam or laser beam to be projected on the metal foils to be welded.

The clamp device of FIG. 7 is intended for use in the circular welding as in the third embodiment, but needless to say a similar magnet type clamp device can be applied to the straight welding as in the fourth of fifth embodiment.

Figure 8:
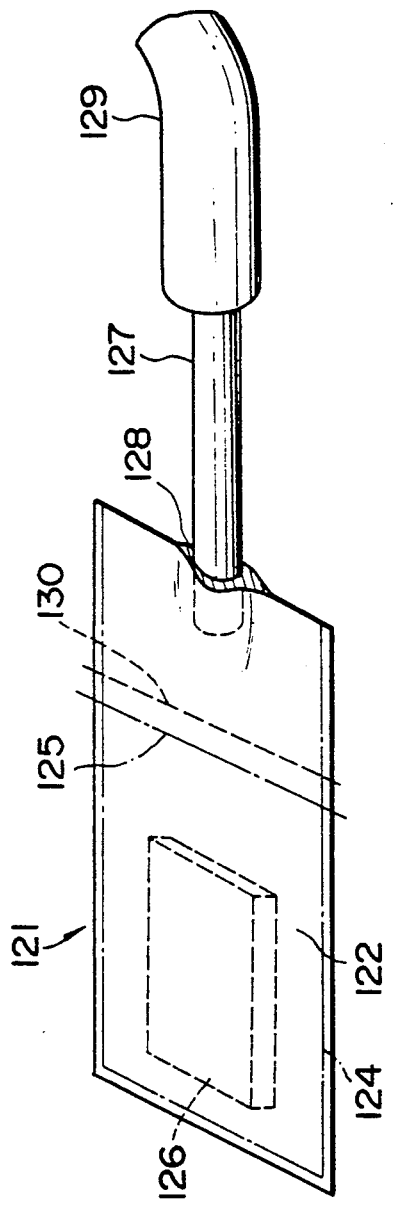
Figure 8:
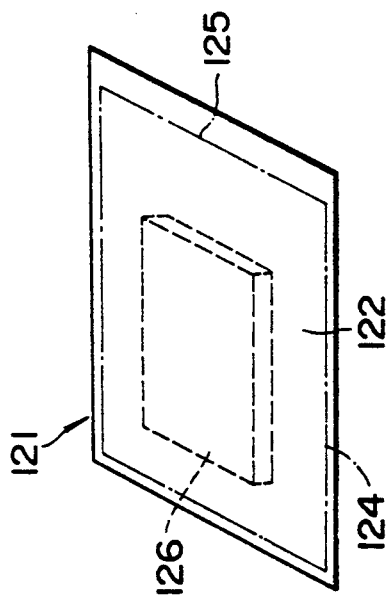

Illustrated in FIGS. 8(1) to 8(4) is the sixth embodiment of the invention. In FIG. 8(1), indicated at 121 is a metal capsule for HIP treatment, consisting of a pair of rectangular metal foils 122 and 122a which are overlapped one on the other and in the form of a bag open at one side and closed at the other three sides by seam welding. The material for the metal foils 122 is selected in consideration of the HIP temperature, reactivity with the processing material and so forth, and is preferred to be a soft material in order to eliminate the drawbacks of the conventional counterparts. For example, it is preferred to use aluminum, lead, soft steel, stainless steel, platinum, molybdenum or the like. From the standpoint of softness, the thickness of the metal foils 122 should be smaller than 300 μm, more preferably smaller than 100 μm, while from the standpoint of easiness of welding it is preferred to be greater than 30 μm. The sealing weld 124 can be formed by electron beam welding, light beam welding or laser beam welding.

Denoted at 126 is a processing material which may be a green compact of ceramics, resin or metal powder formed to shape in a mold, or which may be two or more kinds of plate- or sheet-like samples to be joined.

After putting the processing material 126 in the capsule 121 through the opening 123, and evacuating pipe 127 is inserted into the capsule 121 through the opening 123, which is then hermetically sealed by the use of an adhesive or by soldering. The pipe 127 may be of a metal or of a synthetic resin. An epoxy resin type adhesive is the most convenient means for sealing the opening 123, which however may be sealed by soldering as indicated at 128 in case of a metal pipe 127.

Figure 9:
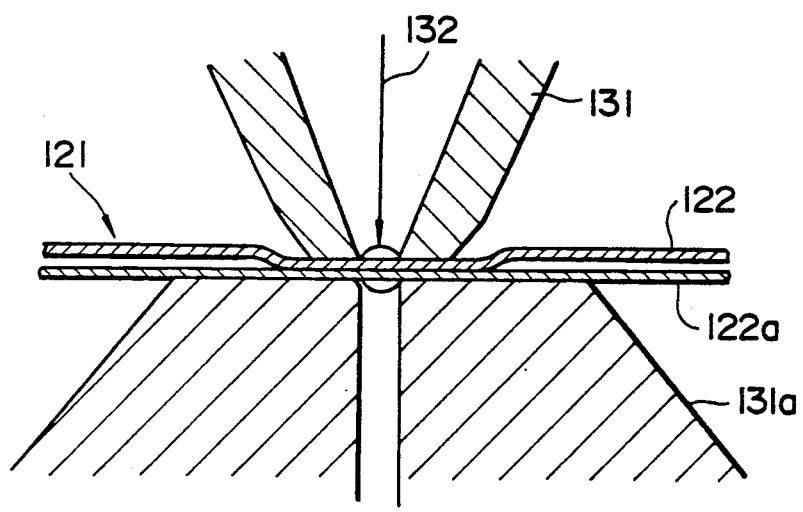
FIG. 9 is a schematic sectional view on an enlarged scale of a capsule undergoing lap welding in the sixth embodiment.

Nextly, as shown in FIG. 8(3), a hose 129 of a vacuum pump or other vacuum device is connected to the pipe 127 to evacuate gases from the capsule 121. As soon as a predetermined vacuum level is reached, the capsule 121 is sealed by lap-welding the overlying and underlying metal foils 122 and 122a at a position between the processing material 126 and the pipe 127. Thereafter, the unnecessary metal foil portions connected to the pipe 127 is cut off with scissors or other suitable means to obtain an encapsulated processing material 126 which is sealed in the capsule 121. For the lap welding operation after vacuum pumping, it is suitable to employ light beam welding, YAG laser beam welding or electron beam welding. In order to form an air-tight weld in the lap welding, it is preferred that the overlapped metal foils 122 and 122a be held in intimate contact with each other in such a manner to make the gap width between the overlapped metal foils smaller than 1/10 of the metal foil thickness. Since the temperature increase in the weld portion might give rise to wrinkles as a result of thermal expansion, it is preferred to hold the capsule 121 from opposite sides by clamps 131 and 131a which are located close to the welding position, while projecting a YAG laser beam 132 on the welding position, as shown particularly in FIG. 9.

According to another aspect of the invention, the capsule which contains the processing material is formed of metal foils, so that upon vacumm pumping it can be easily deformed into a shape conforming with the contour of the outer surfaces of the processing material, facilitating the gas evacuation.

When lap welding the capsule along a line between the processing material and evacuation pipe after vacuum pumping, the overlapped metal foil portions are in intimate contact with each other as a result of the gas evacuation. This facilitates the welding operation and contributes to the formation of a seal of good condition.

Figure 10:
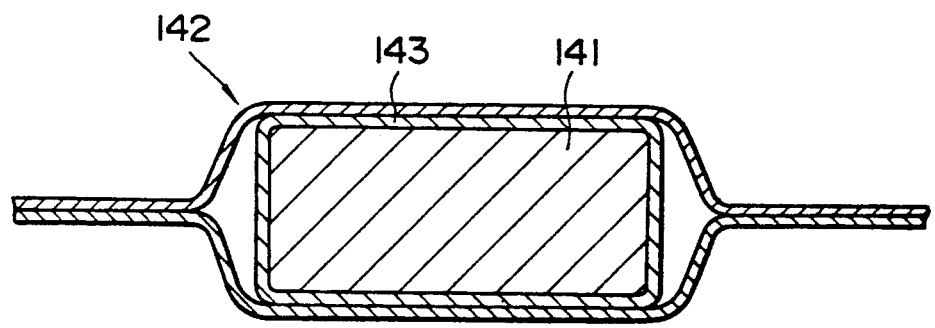
FIG. 10 is a schematic sectional view of a capsule enveloping a processing material with a coating layer.

In the case where the metal foil of the capsule is likely to adhere to processing material during the HIP operation, it is desirable to form a coating layer 143 of sinterless ceramics or the like on the surfaces of the processing material 141 or on the inner surfaces of the capsule 142 as shown in FIG. 10 by melt coating or spraying. In place of the coating layer 143, a ceramic paper may be interposed between the processing material 141 and the capsule 142.

On the other hand, in a case where the material of the capsule 142 is to be joined to a processing material 141 as part of the product, it is desirable to place a foil of zirconium or titanium in a suitable position within the capsule as an oxygen getter or nitrogen getter for the purpose of keeping clean the surface of the processing material 141 and the inner surface of the capsule 142.

Though a couple of metal foils are used in overlapped state in the third and sixth embodiments, one metal foil may be used in folded state as in the first embodiment, or a number of metal foils may be overlapped alternately with a layer of processing material. Further, it is desirable to preshape the metal foils into a container of suitable form in a case where the processing material is of a large thickness and, when clamped, likely to wrinkle the metal foils to such a degree as to render the welding operation difficult. Preshaping of the metal foils is also desirable in case the processing material is subjected to a HIP treatment in powdery form instead of a compacted green body.

Figure 11:
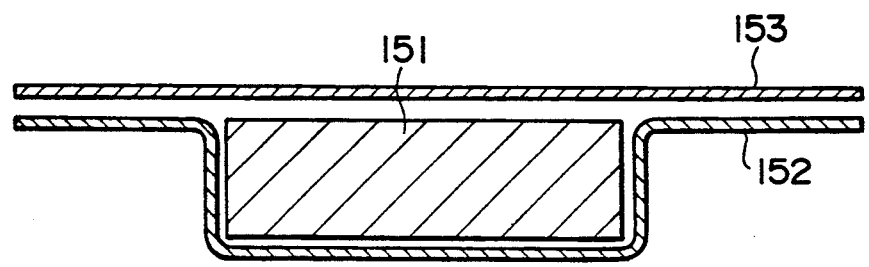
FIG. 11 is a schematic sectional view of a processing material sealed in a capsule with a recessed portion for nesting the processing material.
Figure 12:
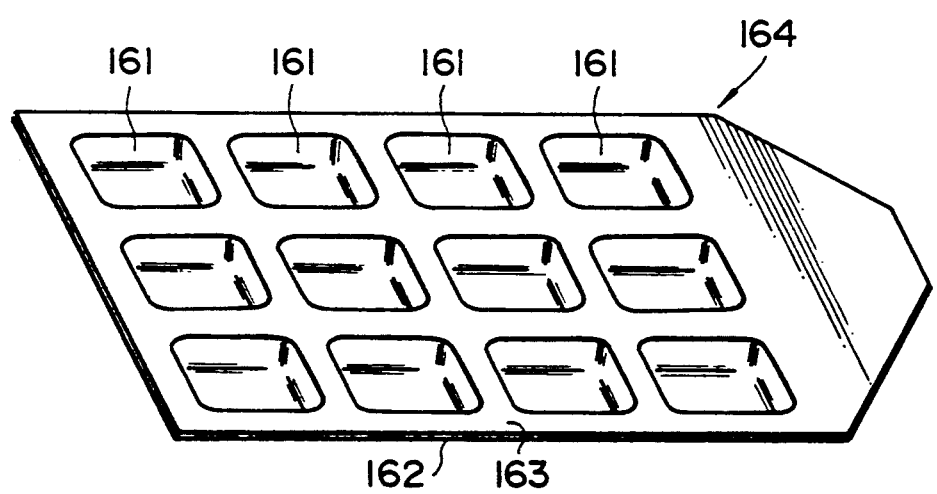
FIG. 12 is schematic perspective view of processing material sealed in a capsule with a large number of recessed portions for nesting the processing material.

FIG. 11 illustrates one of these cases, in which a disk-like processing material 151 is nested in a metal foil 152 with a flange portion and a recess. The processing material 151 is sealed in by a metal foil 153 which is overlaid on the metal foil 152 and welded to the flange portion of the latter.

When processing simultaneously a relatively large number of small-size material for the sake of high efficiency, there may be employed a metal foil 162 which is formed with a corresponding number of recesses 161 to accommodate therein the processing material, overalaying a metal foil 163 and welding its peripheral portions to the underlying foil 162 by seam welding in such a manner as to form a bag-like capsule.

Figure 13:
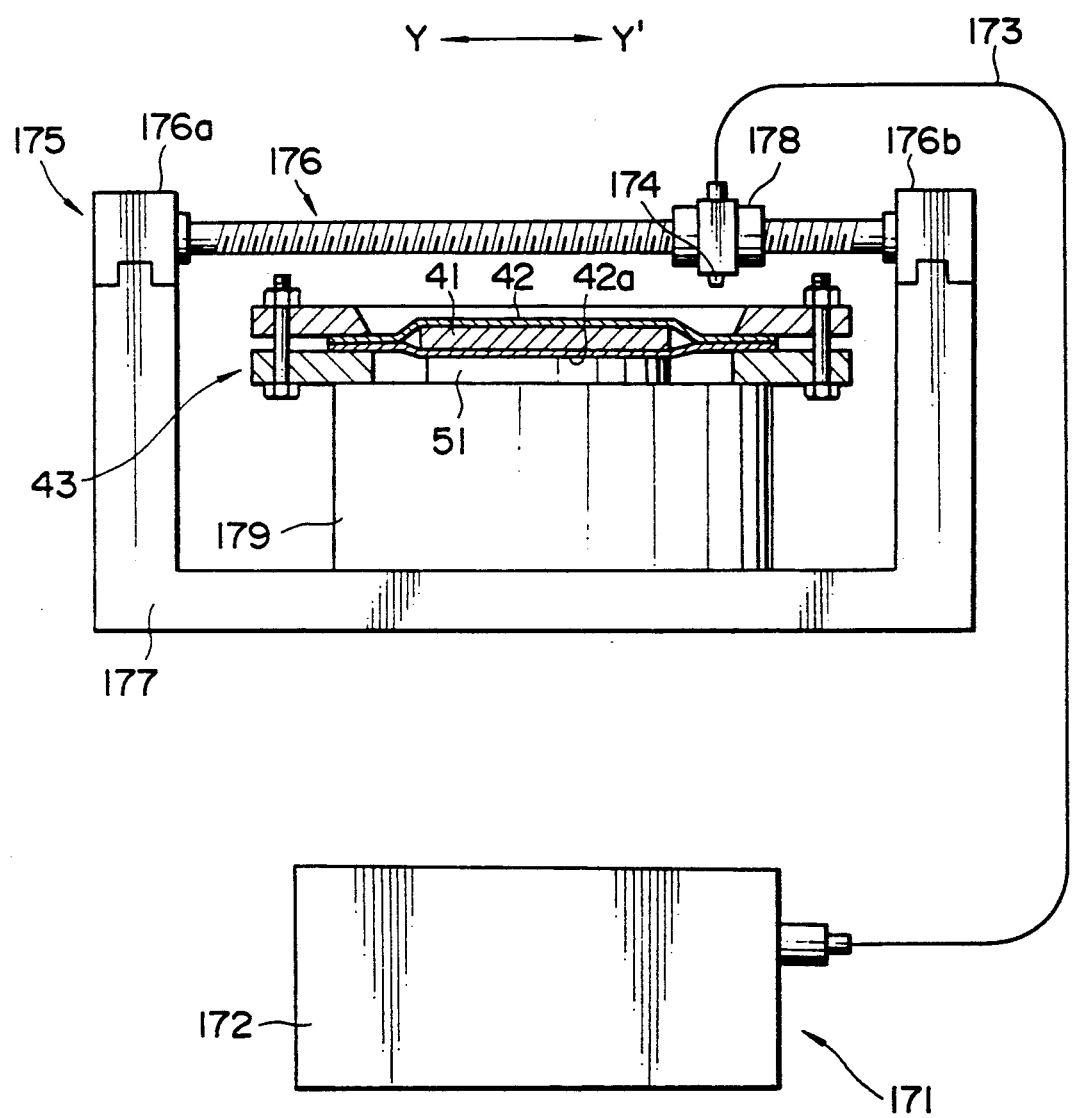
FIG. 13 is a partly cutaway front view of an apparatus for practicing the present invention, which is arranged to form a capsule by laser beam welding.

Illustrated in FIG. 13 is an apparatus suitable for carrying out the present invention, which employs a movable laser type welding machine and wherein those components which are common to FIG. 3(4) are designated by common reference numerals, and their description is omitted to avoid repetitions. In FIG. 13, the laser welding machine indicated at 171 is constituted by a YAG laser generator 172, and an optical fiber cable 173 having one end thereof connected to the output end of the laser generator 172 and provided with a laser beam projecting terminal 174 at the other end.

The laser beam projecting terminal 174 is supported on a feed mechanism 175 for movements along a plane substantially parallel with the surfaces of the metal foils 42 and 42a. The feed mechanism 175 includes a ball screw 176, a pair of roller houses 176a and 176b connected to the opposite ends of the ball screw 176 and each accomodating a roller therein, and a U-shaped frame 177 supporting the roller houses 176a and 176b thereon.

The laser beam projection terminal 174 is mounted on a carriage 178 which is engaged with the ball screw 176 movably in Y-Y' direction of FIG. 13. By rotating the rollers in the roller houses 176a and 176b on the support frame 177, the laser beam projecting terminal 174 of the optical fiber cable is moved also in a direction vertical to the face of FIG. 13. Indicated at 179 is a table for supporting thereon the clamp device 43 which grips the processing material 41 along with the enveloping metal foils 42 and 42a.

The laser beam projecting terminal 174 on the apparatus is moved by means of the ball screw 176 and roller houses 176a and 176b which are operated by a numerical controller (not shown), thereby lap-welding the peripheral portions of the metal foils 42 and 42a to encapsulate the processing material 41 therein. The laser beam is generated by the YAG laser generator 172, which is located in a position remote from the processing material 41, and led through the optical fiber cable 173 to the beam projecting terminal 174 which projects the laser beam on the metal foils.

When an optical fiber cable is used as in this embodiment, it becomes possible not only to install the welding apparatus in an arbitrary position but also the distribute the laser beam from a single laser generator to a plural number of welding heads. Besides, the arrangement of moving the light-weight laser beam projecting terminal of the optical fiber cable instead of heavy welding machine or processing material needs only a feed mechanism of simple construction which will permit to reduce the cost of the apparatus as a whole and robotization of the operation.

Figure 14:
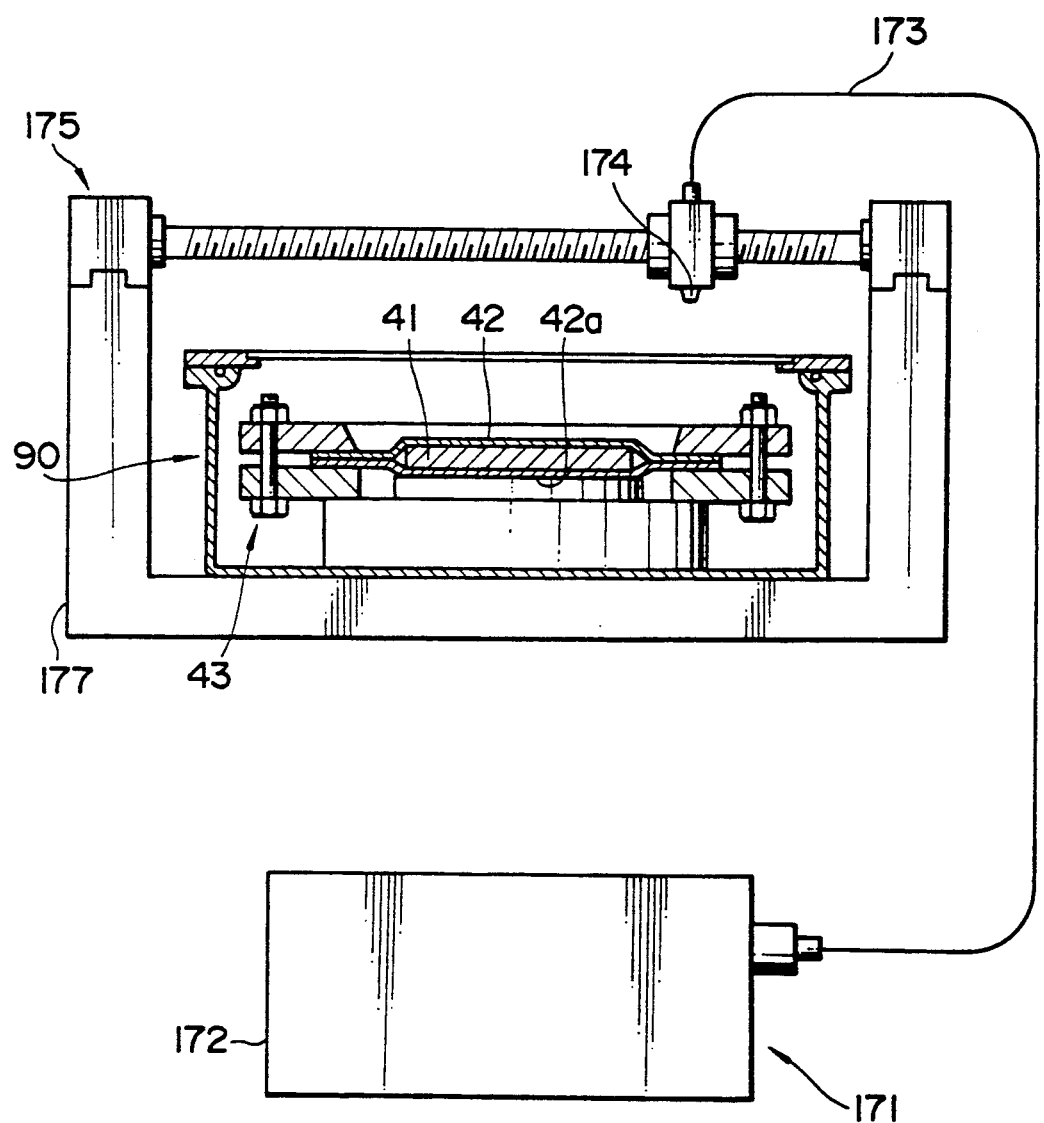
FIG. 14 is a partly cutaway front view of an apparatus for practicing the present invention, which is arranged to form a capsule by laser beam welding in a vacuum chamber.

Illustrated in FIG. 14 is a modification of the encapsulating apparatus which is same as the embodiment of FIG. 13 except that the clamp device 43 holding the processing material 41 and metal foils 42 and 42a is received in a vacuum chamber 90 which is provided on the support table 177 to encapsulate the processing material by the laser welding machine under vacuum condition.

Figure 15:
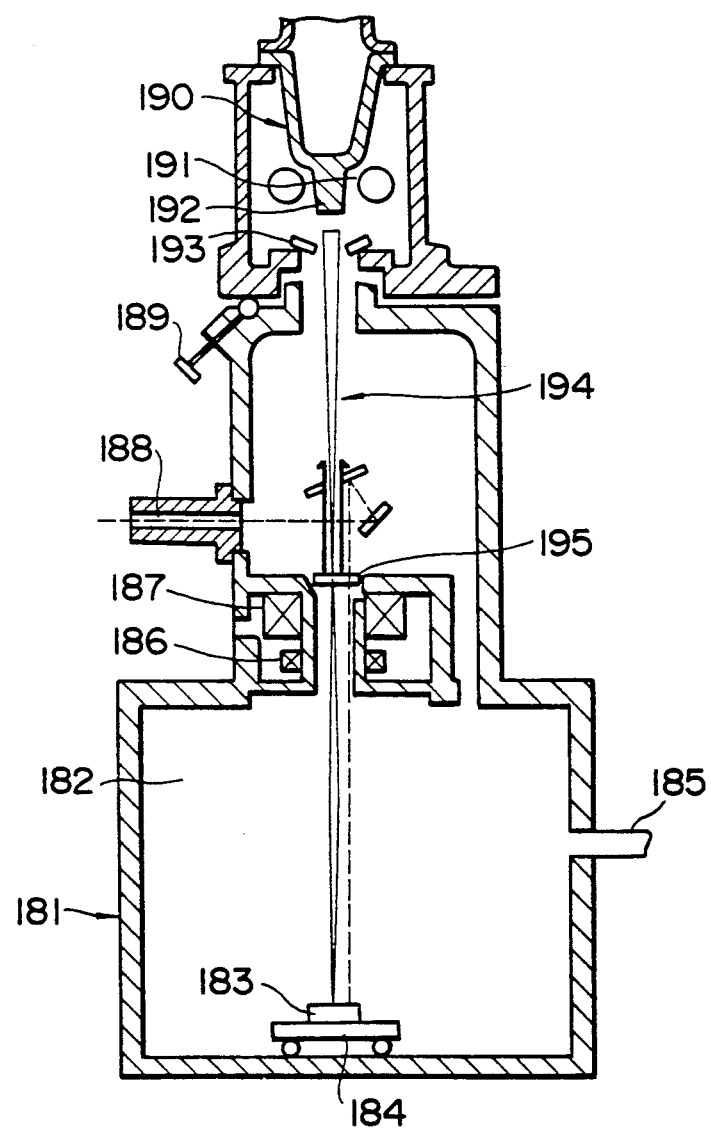
FIG. 15 is a cutaway front view of an apparatus for producing the capsule of the invention, which is arranged to form a capsule by electron beam welding.
Figure 16:
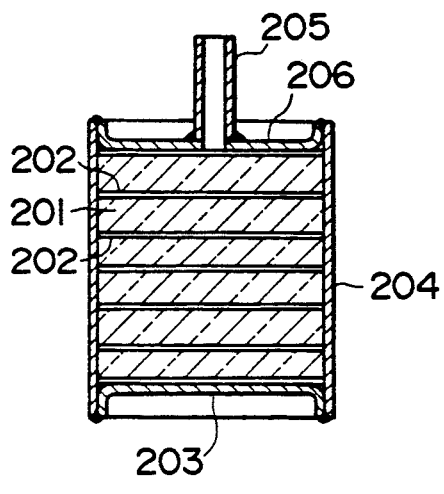
FIG. 16 is a schematic illustration of a conventional method.
Figure 17:
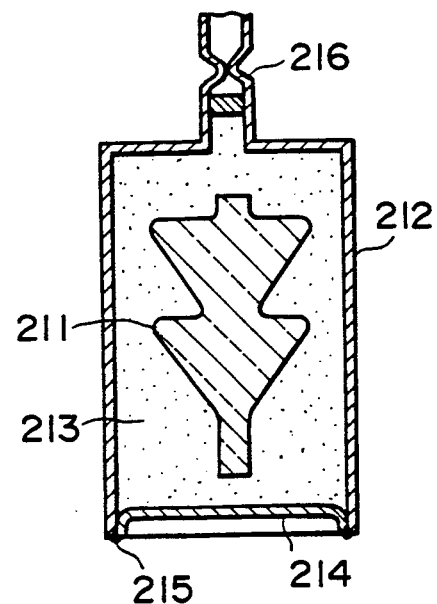
FIG. 17 is a schematic illustration of another conventional method.
Figure 18:
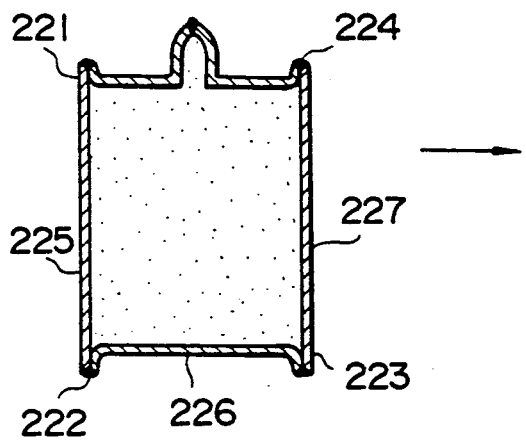
FIG. 18(1) and 18(2) are schematic illustrations of spool-like capsule contraction which takes place in the conventional methods.
Figure 18:
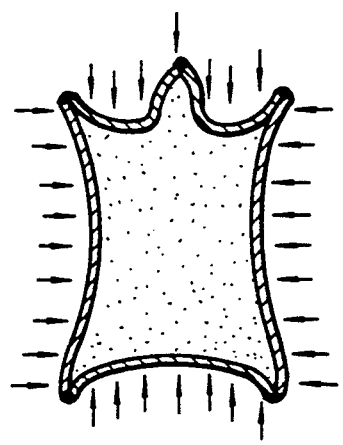

FIG. 15 shows another example of the apparatus for practicing the invention, employing an electron beam welding machine as a welding means. In FIG. 15, the electron beam welding machine includes a hollow housing 181 and an electron gun 190 which is located on the housing 181. The housing 181 has a vacuum chamber 182 is a lower portion of its inner space, which is evacuated through an evacuation pipe 185 and arranged to support an encapsulated processing material 183 (in metal foil capsule) on a feeder table 184. The feeder table 184 is movable in the direction arrowed in the drawing as well as in the direction perpendicular to the face of the drawing. Accommodated in the upper space of the housing 181 are an observation telescope 188, a converging lens 187 and a deflection coil 186. On the other hand, the electron gun 190 has cathode 191, anode 193 and grid 192 at the muzzle to generate an electron beam 194.

In operation of the apparatus shown in FIG. 15, a processing material 183 is placed on the table 184, followed by vacuum pumping for evacuation of the vacuum chamber 182. At this time, the vacuum in the chamber 182 is normally maintained at a level higher than $10^{-4}$ Torr. Nextly, the electron beam 194 from the electron gun 190 is shot on the material 183 in the vacuum chamber 182 through a window 195 to weld the metal foils enveloping the material 183. While looking through the observation telescope 188, the welding position is adjusted coarsely through the feeder table 184 and finely through the deflection coil 186.

In the foregoing embodiments, the processing material for HIP treatment includes, for example, a green body of ceramics powder such as alumina, partially stabilized zirconia, barium titanate, zinc oxide, molybdenum disulfide or the like, a green body of high melting point metal powder such as molybdenum, tungsten or the like, a green body of powder of intermetallic compound such as Ti-Al, Ni-Al or the like, or two or more overlaped plates or sheets of different metals, or a metal or ceramics plate or sheet with melt-sprayed ceramics or metal layer.

In case of WIP, the processing material includes, for example, a polymer material or a green body of a polymer powder such as of ultra-high molecular weight polyethylene, polyamide (nylon), cellulose or the like, or a material having a WIP temperature lower than 300° C.

Hereafter, the invention is illustrated more particularly by way of examples of the invention and comparative examples.

Other features of the invention will become apparent in the course of the following descriptions of exemplary embodiments which are given for illustration of the invention and are not intended to be limiting thereof.

EXAMPLE 1

As shown in FIGS. 1(1) to 1(3), a processing material was encapsulated according to the following steps.

(1) Alumina-base ceramics powder was charged into a rubber mold, and formed to shape by applying a pressure of 1500 kgf/cm$^2$ for 1 minute, obtaining a green body of 30 mm (diam.)×100 mm (h).

(2) The green body resulting from CIP was wrapped in a stainless steel foil of 100, 200 or 300 μm, and, except for one portion, the overlapped foil portions were welded by running a seam welding machine along straight lines.

(3) A pipe connected to a vacuum pump was inserted through an evacuation hole in the non-welded portion, and the vacuum pump was actuated to evacuate gases from the metal foil bag (containing the processing material having BN coated thereon as an offset material).

(4) While the vacuum pump was in operation, the evacuation hole was sealed by welding.

(5) The material in the thus formed metal foil capsule was treated on a HIP apparatus under the conditions based on the following heating-preceding pattern.

1250° C.×2000 kgf/cm$^2$×1 hr.

(6) After the HIP treatment, the metal foil capsule was cut off by the use of scissors to take out the formed product.

The metal foil of each thickness resulted in a product equivalent to conventional counterparts in density and other properties.

EXAMPLE 2

As shown in FIGS. 2(1) to 2(3), a processing material was encapsulated by the following steps.

(1) Polytetrafluoroethylene (hereinafter referred to simply as "PTFE") was formed to shape by cold isostatic pressing, obtaining a green body of 40 mm (diam.)×100 mm (h).

(2) The CIP-formed green body was sandwiched between aluminum foils of 50 μm in thickness, and end portions of the aluminum foils were fixed by the use of clamping jig.

(3) The encapsulating aluminum foil and clamping jig were placed and fixed in a vacuum chamber for electron beam welding (hereinafter referred to as "EBW").

(4) The aluminum foils were sealed by EBW after preadjusting the vacuum chamber to 150° C. and to a sufficient vacuum level.

(5) The material thus encapsulated in the aluminum foils was treated on a HIP apparatus under the conditions based on the following heating-preceding pattern.

370° C.×1000 kgf/cm$^2$×3 hrs.

(6) After the HIP treatment, the capsule was cut off by the use of scissors to take out the formed product. The product was free of voids which were existed at the time of CIP, exhibiting a density equivalent to or higher than conventional counterparts (sintered products).

EXAMPLE 3

(1) Ti-Al powder (Ti=61%) was charged into a rubber mold and formed to shape by cold isostatic pressing retaining a pressure of 1000 kgf/cm$^2$ for 3 minutes, obtaining a green body of 40 mm (diam.)×100 mm (h).

(2) The CIP-formed green body was wrapped in 100 μm thick stainless foils after applying ceramics paper around the body to prevent adhesion of the stainless foils to the CIP-formed body of Ti-Al, namely, to facilitate the removal of the capsule after a HIP treatment.

(3) The encapsulating material was fixed by means of the clamping jig as in the second embodiment, and fixed in a vacuum chamber for EBW.

(4) The capsule portion was sealed by EBW after preconditioning the vacuum chamber to 400° C. and to a sufficient vacuum level.

(5) The material thus encapsulated in the stainless foils was formed on a HIP apparatus under the conditions based on the following heating-preceding pattern.

1050° C.×1500 kgf/cm$^2$×2 hrs.

(6) After the HIP treatment, the formed product could be easily taken out by cutting off the capsule by the use of scissors, free of adhesion or fusion bonding of the foil.

EXAMPLE 4

The clamp device of FIGS. 4(1) to 4(3) was used in this Example.

(1) Powder of ultra-high molecular weight polyethylene (hereinafter referred to simply as "UHMW-P") was formed into a green body of 60 mm (diam.)×5 mm (t) on a molding press.

(2) The thus formed green body was put in a bag of 100 μm thick lead foil, and while sufficiently gripping the end portion of the bag in a clamping jig, the bag was sealed by light beam welding along the edge thereof (protrusion width=2 mm).

(3) The material thus encapsulated in the lead foil was formed on a HIP apparatus under the conditions based on the following heating-preceding pattern.

Heating to 160° C., 1000 kgf/cm$^2$×30 min.

(4) After the HIP treatment, the formed product was taken out by cutting off the capsule with the use of scissors. The products was free of voids which existed at the time of CIP, exhibiting a density equivalent to or higher than conventional counterparts (compression moldings).

The welding conditions were as follows.
Lamp input for light beam: 80 amperes
Welding speed: 80 mm/min
Argon gas flow rate: 20 1/min

EXAMPLE 5

The clamp device of FIGS. 4(1) to 4(3) was used in this Example.

(1) There was prepared a green body of polyamine (nylon 6), a commercial product, of 30 mm (diam.)×100 mm (h).

(2) The green body was charged into a capsule of 100 μm thick lead foil.

(3) The capsule was securely fixed on a clampling jig, with an protrusion width of 2 mm.

(4) The end portion of the capsule fixed on the clamping jig was sealed by light beam welding.

(5) The capsule was subjected to forming on a WIP apparatus, under the conditions of 120° C.×1000 kgf/cm$^2$×1 hr.

(6) After the WIP treatment, the formed product was taken out by cutting off the capsule with use of scissors. Tensile strength test revealed that the formed product had a tensile strength of 720 kgf/cm$^2$, a 10% increase over the value before the WIP treatment, that is to say, over the tensile strength of the green body (a commercial product) which was 650 kgf/cm$^2$.

The welding conditions were as follows.
Lamp input for light beam: 80 amperes
Welding speed: 600 mm/min
Argon gas flow rate: 20 1/min

EXAMPLE 6

The apparatus of FIG. 4(4) was used.

(1) Cellulose powder was formed on a CIP apparatus into a green body of 30 mm (diam.)×80 mm (h).

(2) The green body was put in a bag of 100 μm thick lead foil, and the bag with an opening to be sealed up by welding was fixed together with a clamping jig in a chamber which was closed by a transparent quartz glass sheet.

(3) While maintaining vacuum state in the chamber and capsule, the light beam was projected through the transparent quartz glass sheet at a time point when 10$^{-2}$ torr was reached.

(4) The bag was sealed by light beam welding, moving the clamping jig support table in the chamber at a speed of 800 mm/min.

(5) The thus encapsulated material was formed on a HIP apparatus under the following conditions.

230° C.×2000 kgf/cm$^2$×10 minutes.

(6) After the HIP treatment, the lead foil was removed to take out the formed product. The product was free of voids which existed at the time of CIP forming, with an improved density. The welding conditions were as follows.
Lamp input for light beam: 100 amperes
Welding speed: 800 mm/min

EXAMPLE 7

The encapsulation was carried out by means of the apparatus of FIG. 4(4), using the clamping jig of FIGS. 6(1) to 6(3).

(1) Alumina-base ceramics powder was formed to shape by the use of a CIP apparatus with application of pressure of 1500 kgf/cm$^2$×1 min. to obtain a green body of 30 mm (diam.)×10 mm (h).

(2) The green body formed by CIP was put in a bag of 100 μm thick stainless steel foil, and the bag was sealed by simultaneously welding and fuse-cutting the overlapped foil portions which were gripped in a copper clamping jig.

The simultaneous fuse-cutting and welding operation on the last welding portion was carried out in a chamber. Namely, the capsule and clamping jig were put in the chamber, raising the vacuum level up to 10$^{-2}$ torr to maintain the chamber and capsule in vacuum state. The light beam was then projected through the transparent quartz glass sheet to weld the metal foils while automatically feeding the jig.

The slit width was 4 mm, the lamp input for the light beam was 120 amperes, and the welding speed was 500 mm/min.

(3) The material thus encapsulated in stainless steel foil was formed on a HIP apparatus under the conditions employing the following heating-preceded pattern.

1250° C.×2000 kgf/cm$^2$×1 hr.

(4) After the HIP treatment, the formed product was taken out by cutting off the capsule with scissors. The product was of course free of the voids which existed at the time of CIP forming, and proved to have properties comparable with the conventional counterparts particularly in density and strength.

EXAMPLE 8

The encapsulation was carried out by means of the apparatus of FIG. 5, using the clamping jig of FIGS. 7(1) and 7(2).

(1) Powder of zirconium titanate-base ceramics was formed into a green body of 30 mm (diam.)×about 5 mm (t) by means of a molding press.

(2) The green body was sandwiched between 100 μm thick stainless foils, and gripped in a magnet type clamping device at a position of about 25 mm from the circumference of the green body (or at a position of 80 mm in diameter) as shown in FIGS. 7(1) and 7(2).

BN powder was applied between the green body and stainless foils to prevent reaction between the ceramics and stainless foil.

(3) The clamping jig was placed on a rotary table, and the foils were welded by light beam welding along the slit portion.

(4) The thus encapsulated material was formed on a HIP apparatus under the following conditions.

1050° C.×1000 kgf/cm$^2$×1 hr.

(5) After the HIP treatment, the stainless foil was removed to take out the formed product. The product had been sintered to a sufficient degree and had a density comparable to or higher than conventional capsule-free HIP products.

The welding was effected with a lamp input of 140 amperes and at a welding speed of 50 mm/min.

EXAMPLE 9

The encapsulation was carried out as shown in FIGS. 3(1) to 3(4) or by the following steps.

(1) Ni-Al intermetallic compound powder (with a particle size smaller than 325 mesh) was formed into a green body of 30 mm (diam.)×3 mm (t) by means of a molding press.

(2) The green body was sandwiched between 100 μm thick stainless (SUS 304) foils, which were then held in intimate contact with each other by the use of a magnet type clamping device as shown in FIGS. 7(1) and 7(2). The gap width between the overlapped stainless foils was about 5 mm at maximum.

(3) The stainless foils were lap-welded at a position about 25 mm from the peripheral edge of the green body (at a position of about 80 mm in diameter) by light beam welding to form a capsule.

(4) While forming a seal by welding, the stainless foil portions a little outside of the weld were removed by fuse-cutting. As a result, there was obtained a circular disk-like capsule.

(5) The thus encapsulated green body was put in position on a HIP apparatus, and subjected to a HIP treatment under the conditions of 1300° C.×1000 kgf/cm$^2$×2 hrs. After the HIP treatment, the processed product was taken out by cutting off end portions of the capsule with tinman's scissors and removing the stainless foils which adhered on the material. It was confirmed as a result of measurement of density that the processing material had been sintered into true density. The sinter showed uniform contraction and had extremely flawless surfaces except for a linear mark remained on a surface portion which was in contact with the overlapped stainless foil edge.

EXAMPLE 10

The encapsulation was carried out, following the steps shown in FIGS. 3(1) to 3(3) and then using the apparatus shown in FIG. 14.

(1) Econol resin powder was formed into a green body having a diameter of 30 mm and a thickness of about 5 mm by means of a molding press.

(2) The green body was sandwiched between 50 μm thick aluminum foils, and the overlapped aluminum foils around the green body were held in intimate contact with each other by means of a magnet type clamping device. The gap width between the overlapped aluminum foils was about 0.5 μm at maximum.

(3) The capsule which was gripped in the clamp device was put in a vacuum chamber, followed by vacuum pumping (to a vacuum level of 10$^{-2}$ torr).

(4) The whole vacuum chamber was revolved on a turn table type positioner, while lap-welding the foils by introducing YAG laser beam through the quartz window.

The YAG laser beam was of the pulse laser type, and, in consideration of beam reflections on the aluminum foil and heat dissipation by thermal conduction, the welding operation was conducted with a beam intensity of 60 W and at a speed of 1 cm/sec.

(5) After welding, the capsule was taken out of the vacuum chamber and set on a HIP apparatus for a HIP treatment under the conditions of 360° C. and 1500 kgf/cm$^2$×1 hr. After the HIP treatment, the aluminum foils were cut off with ordinary scissors to take out the sintered product.

(6) The sinter was broken into pieces for structural inspection by a scan type electronic microscope, and as a result it was confirmed that the product had a densified sintered structure free of voids.

EXAMPLE 11

The encapsulation was carried out according to the steps shown in FIGS. 8(1) to 8(3).

(1) An envelope-like capsulte having a width of 80 mm and a length of 150 mm was formed from 100 μm thick stainless (SUS304) foil by the use of a light beam welding machine.

(2) Alumina powder AL-160SG (tradename of a product of Showa Keikinzoku Co. Ltd.) was formed into a plate-like green body of 30 mm×50 mm×5 mm means of a molding press, and the its entire surface was coated with BN powder.

(3) The thus obtained green body was put into the capsule, and a copper evacuation pipe having an outer diameter of 10 mm and an inner diameter of 8 mm was inserted into the opening of the capsule and hermetically connected to the latter by the use of an epoxy resin type adhesive.

(4) After confirming solidification of the adhesive, a vacuum pump hose was connected to the pipe, evacuating gases from the capsule until a vacuum level of 10$^{-2}$ Torr was reached. Then, the overlapped foils were lap-welded by means of a light beam welding machine while clamping the foils as shown in FIG. 8(3), simultaneously fuse-cutting the metal foils on the side of the evacuation pipe.

(5) The green body sealed in the thus evacuated capsule was set on a HIP apparatus for a HIP treatment under the conditions of 1350° C.×1500 kgf/cm$^2$×1 hr.

(6) After the HIP treatment, the sintered alumina was taken out by cutting off the capsule with the use of tinman's scissors. The alumina was confirmed to have been densified to 3.89 g/cm$^2$, and shrunk substantially into like figures of approximately 23.5 mm×43 mm×4.2 mm.

EXAMPLE 12

(1) Ultra-hard powder was formed into a green body of ring shape having an outer diameter of 250 mm, an inner diameter of 8.5 mm and a thickness of 6 mm on a CIP apparatus by application of 1000 kgf/cm$^2$ for 1 minute.

(2) The thus formed green body was covered with ceramics paper, and, after setting five titanium foils of 30 mm×30 mm×0.1 mm (t) on the outer sides, wrapped in a 100 μm thick stainless foil. The titanium foils were used to remove oxygen gas whidch would be generated from adsorption gases at the HIP forming stage.

(3) The overlapped foil portions which were securely gripped in a copper clamping jig were lap-welded simultaneously with fuse-cutting of the foils. The simultaneous welding and fuse-cutting operation on the final closing portion was carried out in a chamber.

The resulting capsule and the copper clamping device were put in a chamber, which was vacuum-pumped to 10$^{-2}$ torr while maintaining the chamber and capsule in vacuum state. Then, a light beam was projected through the transparent quartz glass sheet to weld the metal foils on the jig which was being fed automatically (4) The green body thus encapsulated in stainless foil was formed on a HIP apparatus under the conditions of the following heating-preceding pattern.

1300° C×1000 kgf/cm$^2$×1 hr.

(5) After the HIP treatment, the sintered product was taken out by cutting off the capsule with scissors. The sinter was proved to be equivalent to conventional counterparts as a result of assessment of properties such as density and strength.

EXAMPLE 13

(1) Polytetrafluoroethylene (hereafter referred to as "PTFE") was formed to shape by cold isostatic pressing to obtain a green body of 40 mm (diam.)×100 mm (h).

(2) The green body obtained by CIP was wrapped in 100 µm thick aluminum foil together with titanium foil of 30 mm×30 mm×0.1 mm (t).

(3) The aluminum foil capsule was sealed by YAG welding in vacuum (at room temperature).

(4) The green body thus encapsulated in aluminum foil was formed on a HIP apparatus under the conditions employing the following heating-preceding pattern.

370° C. × 1000 kgf/cm² × 3 hrs.

(5) After the HIP treatment, the product was taken out by cutting off the capsule with scissors. The product was free of voids which remained at the stage of CIP forming, and proved to be equivalent or better than conventional counterparts in density. The insertion of a titanium foil in the capsule contributed to remove air, adsorbed moisture and adsorbed gases which slightly remained in the capsule.

COMPARATIVE EXAMPLE 1

(1) A green body was formed by CIP according to the same procedures as in Example 2, and wrapped in 25 µm thick aluminum foil.

(2) The HIP test was conducted under the same conditions (with respect to three specimens).

(3) After the HIP treatment, the capsule was removed to take out the sintered product.

The voids which existed at the CIP forming stage still remained partly, failing to attain an appreciable improvement in density as compared with Example 2.

Damages occurred to aluminum foils during transfer subsequent to the encapsulation, in some cases resulting in discard of the capsule before the HIP treatment.

Small pinholes were found upon SEM observation of the 25 µm thick aluminum foil, implying that the capsule was not maintained in sufficiently sealed state. however, 50 µm thick aluminum foils were free of pinholes and problems regarding the hermetical seal.

COMPARATIVE EXAMPLE 2

(1) A green body was formed by CIP according to the same procedures as in Example 1, and wrapped in a 400 µm thick stainless foil.

(2) Gases in the capsule were evacuated by vacuum pumping in the welding stage, but the metal foil would not come into conformity with the contour of the green body. Therefore, the product had undergone uneven deformation during a HIP treatment, showing differences in density between various parts of the sintered body.

Besides, since the thickness of the metal foil was as large as 400 µm, it was difficult to cut it off easily with tinman's scissors and it took time to remove the capsule by the use of a cutting machine.

Although the invention has been described and illustrated by way of preferred embodiments and examples, it is to be understood that the method of the invention can be put into practice by the use of other alternative means without departing from the spirit and subject matter of the invention.

Further, it is to be understood that the preferred embodiments and examples in this specification are given only for the purpose of illustration and should not be construed as being limitative of the invention, and that the invention includes all the modifications and alterations as encompassed by the appended claims.

What is claimed is:

1. A method of encapsulating a material to be processed by warm or hot isostatic pressing comprising the steps of:
   a. enveloping a processing material in the form of loose or compacted powder with a metal foil of 30 µm to 300 µm in thickness, wherein said processing material is covered with a ceramic or ceramic and metal layer which prevents adhesion between the processing material and the metal foil capsule; and
   b. welding overlying and underlying metal foil portions to encapsulate said processing material in said metal foil in a sealed state.

2. A method of encapsulating a material to be processed by warm or hot isostatic pressing, said method comprising the steps of:
   a. enveloping a processing material in the form of loose or compacted powder with a metal foil of 30 µm to 300 µm in thickness, wherein said processing material is covered with a ceramic or ceramic and metal layer which prevents adhesion between the processing material and the metal foil capsule; and
   b. welding overlying and underlying foil portions in an inert gas atmosphere to encapsulate said processing material in said metal foil in a sealed state.

3. A method of encapsulating a material to be processed by warm or hot isostatic pressing, said method comprising the steps of:
   a. enveloping a processing material in the form of loose or compacted powder with a metal foil of 30 µm to 300 µm in thickness, wherein said processing material is covered with a ceramic or ceramic and metal layer which prevents adhesion between the processing material and the metal foil capsule;
   placing said processing material and enveloping metal foil in a chamber with a window;
   c. evacuating gases from said chamber by vacuum pumping;
   d. welding overlying and underlying metal foil portions with a beam projected through said window to encapsulate said processing material in said metal foil in a sealed state.

4. A method of encapsulating a material to be processed by warm or hot isostatic pressing, said method comprising the steps of:
   a. enveloping a processing material in the form of loose or compacted powder with a metal foil of 30 µm to 300 µm in thickness, wherein said processing material is covered with a ceramic or ceramic and metal layer which prevents adhesion between the processing material and the metal foil capsule;
   b. holding overlying and underlying metal foil portions in intimate contact with each other in such a manner as to make the gap width between said metal foil portions smaller than 1/10 of the thickness of said metal foil;

c. welding the intimately contacting metal foil portions to encapsulate said processing material in said metal foil in a sealed state.

5. A method of encapsulating a material to be processed by warm or hot isostatic pressing, said method comprising the steps of:
   a. enveloping a processing material in the form of loose or compacted powder with a metal foil of 30 $\mu$m to 300 $\mu$m in thickness, wherein said processing material is covered with a ceramic or ceramic and metal layer which prevents adhesion between the processing material and the metal foil capsule;
   b. inserting an evacuation pipe into an opening of said bag-like metal foil and hermetically closing said opening on said pipe;
   c. evacuating gases from said bag-like metal foil by vacuum pumping through said evacuation pipe; and
   d. lap-welding said metal foil along a line between said processing material and said evacuation pipe to encapsulate said processing material in said metal foil in a sealed state.

6. A method as defined in claim 5, wherein said opening of said bag-like metal foil is hermetically closed by bonding said metal foil to said evacuation pipe by the use of an adhesive.

7. A method as defined in claims 1, 2, 3, 4 or 5, wherein said processing material is covered with a sinterless ceramic interposed between said processing material and said metal foil capsule.

8. A method as defined in claims 1, 2, 3, 4, or 5, wherein said processing material is covered with ceramic paper before being enveloped in said metal foil.

9. A method as defined in claims 1, 2, 3, 4 or 5, wherein said processing material is enveloped in said metal foil together with a zirconium foil.

10. A method as defined in claims 1, 2, 3, 4, or 5, wherein said processing material is enveloped in said metal foil together with a titanium foil.

11. A method as defined in claims 1, 2, 3, 4 or 5, wherein said metal foil is composed of a tray portion having at least one recess for receiving said processing material and a flat lid portion.

* * * * *